US012634264B2

(12) United States Patent
Takahashi

(10) Patent No.: US 12,634,264 B2
(45) Date of Patent: **\*May 19, 2026**

(54) SECURE END-TO-END COMMUNICATION SYSTEM

(71) Applicant: SECTURION SYSTEMS, INC., Centerville, UT (US)

(72) Inventor: Richard J. Takahashi, Layton, UT (US)

(73) Assignee: SECTURION SYSTEMS, INC., Centerville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,340

(22) Filed: Jun. 7, 2021

(65) Prior Publication Data

US 2022/0174049 A1 Jun. 2, 2022

Related U.S. Application Data

(63) Continuation of application No. 15/163,150, filed on May 24, 2016, now Pat. No. 11,063,914, which is a
(Continued)

(51) Int. Cl.
*H04L 29/06* (2006.01)
*H04L 9/08* (2006.01)
(Continued)

(52) U.S. Cl.
CPC ............ *H04L 63/0428* (2013.01); *H04L 9/08* (2013.01); *H04L 9/14* (2013.01); *H04L 63/0281* (2013.01);
(Continued)

(58) Field of Classification Search
CPC ......... H04L 63/0428; H04L 9/08; H04L 9/14; H04L 63/0281; H04L 63/061; H04L 2209/80
(Continued)

(56) References Cited

U.S. PATENT DOCUMENTS 4,319,079 A 3/1982 Best
4,357,529 A 11/1982 Atalia
(Continued)

FOREIGN PATENT DOCUMENTS

EP 2337304 6/2011
EP 3350974 7/2018
(Continued)

OTHER PUBLICATIONS

Eguro, "FPGAS for trusted cloud computing", 2012, IEEE, pp. 63-70 (Year: 2012).*
(Continued)

*Primary Examiner* — Taghi T Arani
*Assistant Examiner* — Gregory A Lane
(74) *Attorney, Agent, or Firm* — Greenberg Traurig LLP

(57) ABSTRACT

A secure end-to-end communication system is implemented via one or more security processing devices. In one embodiment, a method includes: loading, by a key manager, a first set of keys into a security device; encrypting first data with the first set of keys using the security device; and sending, over a network, the encrypted first data to an external site or a mobile device. The method may further include: requesting the encrypted data from the external site or mobile device; receiving, over the network, the encrypted first data; and decrypting the received encrypted first data with the first set of keys using the security device.

17 Claims, 16 Drawing Sheets

Related U.S. Application Data continuation of application No. 14/219,651, filed on Mar. 19, 2014, now Pat. No. 9,374,344.

(60) Provisional application No. 61/806,757, filed on Mar. 29, 2013.

(51) Int. Cl.
*H04L 9/14* (2006.01)
*H04L 9/40* (2022.01)

(52) U.S. Cl.
CPC ........ *H04L 63/061* (2013.01); *H04L 2209/80* (2013.01)

(58) Field of Classification Search
USPC .......................................................... 713/168
See application file for complete search history.

(56) References Cited

U.S. PATENT DOCUMENTS

| | | | |
|---|---|---|---|
| 5,351,299 A * | 9/1994 | Matsuzaki | H04L 9/002 |
| | | | 380/42 |
| 5,594,797 A | 1/1997 | Alan ar a et al. | |
| 5,602,916 A | 2/1997 | Grube | |
| 5,631,960 A | 5/1997 | Likens et al. | |
| 5,892,962 A | 4/1999 | Cloutier | |
| 5,915,025 A | 6/1999 | Taguchi et al. | |
| 5,961,626 A | 10/1999 | Harrison et al. | |
| 5,995,628 A | 11/1999 | Kitaj et al. | |
| 6,044,388 A | 3/2000 | DeBellis et al. | |
| 6,081,895 A | 6/2000 | Harrison et al. | |
| 6,101,255 A | 8/2000 | Harrison et al. | |
| 6,128,666 A | 10/2000 | Muller et al. | |
| 6,157,955 A | 12/2000 | Narad | |
| 6,275,588 B1 * | 8/2001 | Videcrantz | H04L 63/12 |
| | | | 713/168 |
| 6,304,973 B1 | 10/2001 | Williams | |
| 6,351,813 B1 | 2/2002 | Mooney | |
| 6,378,072 B1 | 4/2002 | Collins | |
| 6,515,993 B1 | 2/2003 | Williams et al. | |
| 6,550,012 B1 | 4/2003 | Villa et al. | |
| 6,567,913 B1 | 5/2003 | Ryan, Jr. | |
| 6,577,734 B1 | 6/2003 | Etzel et al. | |
| 6,598,161 B1 | 7/2003 | Kluttz et al. | |
| 6,715,028 B1 | 3/2004 | Toda | |
| 6,845,446 B1 | 1/2005 | Fuller | |
| 6,983,366 B1 | 1/2006 | Huynh | |
| 7,171,000 B1 | 1/2007 | Toh et al. | |
| 7,200,756 B2 | 4/2007 | Griffin et al. | |
| 7,277,941 B2 | 10/2007 | Ignatius et al. | |
| 7,370,348 B1 | 5/2008 | Patel | |
| 7,382,787 B1 | 6/2008 | Barnes et al. | |
| 7,421,576 B1 | 9/2008 | Kent | |
| 7,496,764 B2 * | 2/2009 | Robert | H04N 21/63 |
| | | | 380/30 |
| 7,594,262 B2 | 9/2009 | Hanzlik et al. | |
| 7,607,167 B1 | 10/2009 | Johnson et al. | |
| 7,639,696 B2 | 12/2009 | Wu | |
| 7,644,268 B2 | 1/2010 | Filipi-Martin et al. | |
| 7,716,467 B1 | 5/2010 | Deffet et al. | |
| 7,734,844 B2 | 6/2010 | Pedersen et al. | |
| 7,773,754 B2 | 8/2010 | Buer et al. | |
| 7,792,300 B1 | 9/2010 | Caronni | |
| 7,804,504 B1 | 9/2010 | Agarwal | |
| 7,814,316 B1 | 10/2010 | Hughes et al. | |
| 7,836,490 B2 | 11/2010 | Smith | |
| 7,849,306 B2 | 12/2010 | Takeshima et al. | |
| RE42,212 E | 3/2011 | Hoffman | |
| 7,908,472 B2 * | 3/2011 | Freed | H04L 63/04 |
| | | | 713/153 |
| 7,920,701 B1 | 4/2011 | Cox et al. | |
| 7,921,284 B1 | 4/2011 | Kinghorn et al. | |
| 7,921,288 B1 | 4/2011 | Hildebrand | |
| 7,929,701 B1 | 4/2011 | Sprunk | |
| 7,930,540 B2 | 4/2011 | Ahuja et al. | |
| 7,930,756 B1 | 4/2011 | Crocker et al. | |
| 7,958,351 B2 | 6/2011 | Luthl | |
| 7,996,670 B1 | 8/2011 | Krishna et al. | |
| 8,065,713 B1 | 11/2011 | Vainstein et al. | |
| 8,073,949 B2 | 12/2011 | Cunchon et al. | |
| 8,166,289 B2 | 4/2012 | Owens et al. | |
| 8,219,799 B1 | 7/2012 | Lucchesi | |
| 8,229,116 B2 | 7/2012 | Ogata | |
| 8,230,207 B2 | 7/2012 | Iyer et al. | |
| 8,234,686 B2 | 7/2012 | Alvermann et al. | |
| 8,266,433 B1 * | 9/2012 | Przykucki | H04L 63/06 |
| | | | 713/168 |
| 8,266,670 B1 | 9/2012 | Merkow et al. | |
| 8,275,984 B2 | 9/2012 | Loveless | |
| 8,289,975 B2 | 10/2012 | Suganthi et al. | |
| 8,307,206 B2 | 11/2012 | Ahuja et al. | |
| 8,356,177 B2 | 1/2013 | McGrew et al. | |
| 8,386,768 B2 | 2/2013 | Nair et al. | |
| 8,407,194 B1 | 3/2013 | Chaput et al. | |
| 8,416,954 B1 | 4/2013 | Raizen et al. | |
| 8,418,252 B2 | 4/2013 | Akyol et al. | |
| 8,433,783 B2 | 4/2013 | Jackowski et al. | |
| 8,433,929 B2 | 4/2013 | Yamashita | |
| 8,438,626 B2 | 5/2013 | Anderson et al. | |
| 8,443,069 B2 | 5/2013 | Bagepalli et al. | |
| 8,452,956 B1 | 5/2013 | Kersey | |
| 8,478,997 B2 | 7/2013 | Lapp | |
| 8,479,304 B1 | 7/2013 | Clifford | |
| 8,533,494 B2 | 9/2013 | Harada | |
| 8,536,957 B1 | 9/2013 | Nakamura et al. | |
| 8,539,571 B2 | 9/2013 | Smith | |
| 8,561,127 B1 | 10/2013 | Agrawal et al. | |
| 8,590,057 B1 * | 11/2013 | Mayblum | H04L 63/0428 |
| | | | 726/28 |
| 8,594,335 B1 | 11/2013 | Izhar et al. | |
| 8,595,814 B2 | 11/2013 | Le et al. | |
| 8,631,460 B2 | 1/2014 | Shea et al. | |
| 8,681,974 B1 | 3/2014 | Langhammer | |
| 8,707,020 B1 | 4/2014 | Lengyel et al. | |
| 8,751,826 B2 | 6/2014 | O'Connor et al. | |
| 8,811,620 B2 | 8/2014 | Chaves et al. | |
| 8,813,247 B1 | 8/2014 | Alten | |
| 8,909,942 B1 | 12/2014 | Obukhov et al. | |
| 8,935,523 B1 | 1/2015 | Osburn, III | |
| 8,966,249 B2 | 2/2015 | Lindteigen | |
| 8,966,288 B2 | 2/2015 | Ignatius et al. | |
| 8,988,713 B2 | 3/2015 | Gutnik et al. | |
| 9,088,538 B2 | 7/2015 | Indteigen et al. | |
| 9,100,361 B1 | 8/2015 | Lucchesi et al. | |
| 9,191,200 B1 | 11/2015 | Adams et al. | |
| 9,227,139 B2 | 1/2016 | Mamtani et al. | |
| 9,230,112 B1 | 1/2016 | Peterson | |
| 9,245,148 B2 | 1/2016 | Runkis et al. | |
| 9,305,185 B1 | 4/2016 | Pedersen | |
| 9,306,917 B2 | 4/2016 | Brugger et al. | |
| 9,317,705 B2 | 4/2016 | O'Hare et al. | |
| 9,317,718 B1 | 4/2016 | Takahashi | |
| 9,355,279 B1 | 5/2016 | Takahashi | |
| 9,374,344 B1 | 6/2016 | Takahashi | |
| 9,374,345 B2 | 6/2016 | Brugger et al. | |
| 9,378,359 B2 | 6/2016 | Qureshi et al. | |
| 9,380,048 B2 | 6/2016 | Lindteigen et al. | |
| 9,524,399 B1 | 12/2016 | Takahashi | |
| 9,536,103 B2 | 1/2017 | Redberg | |
| 9,560,019 B2 | 1/2017 | Barney | |
| 9,660,964 B2 | 5/2017 | Asiedu | |
| 9,680,801 B1 | 6/2017 | Martini | |
| 9,690,598 B2 | 6/2017 | Lindteigen | |
| 9,692,605 B2 | 6/2017 | Lindteigen et al. | |
| 9,705,854 B2 | 7/2017 | Khazan | |
| 9,794,064 B2 | 10/2017 | Takahashi | |
| 9,794,270 B2 | 10/2017 | Lindteigen | |
| 9,798,899 B1 | 10/2017 | Takahashi | |
| 9,858,442 B1 | 1/2018 | Takahashi | |
| 9,871,662 B2 | 1/2018 | Glisson | |
| 9,916,456 B2 | 3/2018 | O'Hare et al. | |
| 10,013,580 B2 | 7/2018 | Takahashi | |
| 10,114,766 B2 | 10/2018 | Takahashi | |

(56)                References Cited

U.S. PATENT DOCUMENTS

| | | | |
|---|---|---|---|
| 10,708,236 B2 | 7/2020 | Takahashi | |
| 10,902,155 B2 | 1/2021 | Takahashi | |
| 11,063,914 B1 | 7/2021 | Takahashi | |
| 11,283,774 B2 | 3/2022 | Anderson et al. | |
| 11,288,402 B2 | 3/2022 | Takahashi | |
| 11,429,540 B2 | 8/2022 | Takahashi | |
| 11,783,089 B2 | 10/2023 | Takahashi | |
| 11,792,169 B2 | 10/2023 | Anderson et al. | |
| 11,921,906 B2 | 3/2024 | Takahashi | |
| 2001/0042124 A1 | 11/2001 | Barron | |
| 2002/0025045 A1 | 2/2002 | Raike | |
| 2002/0027906 A1 | 3/2002 | Athreya | |
| 2002/0029280 A1 | 3/2002 | Holden | |
| 2002/0083317 A1 | 6/2002 | Ohta | |
| 2002/0091975 A1 | 7/2002 | Redlich et al. | |
| 2002/0099959 A1 | 7/2002 | Redlich et al. | |
| 2002/0104020 A1 | 8/2002 | Strahm | |
| 2002/0162024 A1 | 10/2002 | Cunchon | |
| 2002/0165961 A1 | 11/2002 | Everdell et al. | |
| 2003/0012373 A1 | 1/2003 | Ogura et al. | |
| 2003/0014627 A1 | 1/2003 | Krishna et al. | |
| 2003/0023846 A1 | 1/2003 | Krishna | |
| 2003/0051054 A1 | 3/2003 | Redlich et al. | |
| 2003/0070077 A1 | 4/2003 | Redlich et al. | |
| 2003/0074552 A1 | 4/2003 | Olkin et al. | |
| 2003/0076959 A1 | 4/2003 | Chui | |
| 2003/0119484 A1 | 6/2003 | Adachi et al. | |
| 2003/0120949 A1 | 6/2003 | Redlich et al. | |
| 2003/0172279 A1 | 9/2003 | Yudasaka | |
| 2003/0182435 A1 | 9/2003 | Redlich et al. | |
| 2003/0196108 A1 | 10/2003 | Kung | |
| 2003/0210702 A1 | 11/2003 | Kendall | |
| 2004/0034772 A1* | 2/2004 | Alao | H04L 9/302 |
| | | | 713/168 |
| 2004/0054914 A1 | 3/2004 | Sullivan | |
| 2004/0083286 A1 | 4/2004 | Holden | |
| 2004/0114558 A1 | 6/2004 | Krishnamurthi et al. | |
| 2004/0123096 A1 | 6/2004 | Buer | |
| 2004/0123119 A1 | 6/2004 | Buer | |
| 2004/0123120 A1 | 6/2004 | Buer | |
| 2004/0123121 A1 | 6/2004 | Paaske | |
| 2004/0123123 A1 | 6/2004 | Buer | |
| 2004/0139313 A1 | 7/2004 | Buer | |
| 2004/0143734 A1 | 7/2004 | Buer | |
| 2004/0148500 A1 | 7/2004 | Olkin et al. | |
| 2004/0151323 A1 | 8/2004 | Olkin et al. | |
| 2004/0153642 A1 | 8/2004 | Plotkin et al. | |
| 2004/0196979 A1 | 10/2004 | Cheng et al. | |
| 2004/0250082 A1 | 12/2004 | Li | |
| 2005/0010690 A1 | 1/2005 | Marshall et al. | |
| 2005/0097357 A1 | 5/2005 | Smith | |
| 2005/0132070 A1 | 6/2005 | Redlich et al. | |
| 2005/0138109 A1 | 6/2005 | Redlich et al. | |
| 2005/0138110 A1 | 6/2005 | Redlich et al. | |
| 2005/0138654 A1 | 6/2005 | Minne | |
| 2005/0166066 A1 | 7/2005 | Ahuja et al. | |
| 2005/0190758 A1 | 9/2005 | Gai et al. | |
| 2005/0198412 A1* | 9/2005 | Pedersen | H04L 9/0894 |
| | | | 710/30 |
| 2005/0198498 A1 | 9/2005 | Gaur | |
| 2005/0198500 A1 | 9/2005 | Gaur | |
| 2005/0216413 A1 | 9/2005 | Murakami et al. | |
| 2005/0257062 A1 | 11/2005 | Ignatius et al. | |
| 2006/0015748 A1 | 1/2006 | Goto | |
| 2006/0059537 A1 | 3/2006 | Alvermann et al. | |
| 2006/0059553 A1 | 3/2006 | Morais | |
| 2006/0062394 A1 | 3/2006 | Kamijo | |
| 2006/0117126 A1 | 6/2006 | Leung et al. | |
| 2006/0129810 A1 | 6/2006 | Jeong | |
| 2006/0133604 A1 | 6/2006 | Buer et al. | |
| 2006/0140410 A1* | 6/2006 | Aihara | H04L 9/0891 |
| | | | 380/273 |
| 2006/0149965 A1 | 7/2006 | Sharma | |
| 2006/0174102 A1 | 8/2006 | Smith et al. | |
| 2006/0174112 A1 | 8/2006 | Wray | |
| 2007/0067630 A1 | 3/2007 | Lenkov et al. | |
| 2007/0067634 A1 | 3/2007 | Siegler | |
| 2007/0074020 A1 | 3/2007 | Nishimura | |
| 2007/0076599 A1 | 4/2007 | Ayyagari | |
| 2007/0109124 A1 | 5/2007 | Park | |
| 2007/0115812 A1 | 5/2007 | Hughes | |
| 2007/0136801 A1 | 6/2007 | Le et al. | |
| 2007/0150720 A1 | 6/2007 | Oh | |
| 2007/0160198 A1 | 7/2007 | Orsini et al. | |
| 2007/0189517 A1 | 8/2007 | Koseki et al. | |
| 2007/0192596 A1 | 8/2007 | Otsuka | |
| 2007/0195951 A1 | 8/2007 | Leung, Jr. | |
| 2007/0195960 A1 | 8/2007 | Goldman | |
| 2007/0204159 A1 | 8/2007 | Hara | |
| 2007/0237327 A1 | 10/2007 | Taylor | |
| 2007/0245141 A1 | 10/2007 | O'Keeffe | |
| 2007/0245413 A1 | 10/2007 | Andolina | |
| 2007/0250921 A1 | 10/2007 | LiVecchi | |
| 2007/0258586 A1 | 11/2007 | Huang et al. | |
| 2007/0271355 A1* | 11/2007 | Creemer | G06Q 30/0241 |
| | | | 709/219 |
| 2008/0002724 A1 | 1/2008 | Grewal | |
| 2008/0005569 A1 | 1/2008 | Watson et al. | |
| 2008/0010233 A1 | 1/2008 | Sack | |
| 2008/0013733 A1 | 1/2008 | Johansson | |
| 2008/0022136 A1 | 1/2008 | Mattson | |
| 2008/0037777 A1 | 2/2008 | Ignatius et al. | |
| 2008/0052533 A1 | 2/2008 | Iida et al. | |
| 2008/0052765 A1 | 2/2008 | Shinomiya et al. | |
| 2008/0062803 A1 | 3/2008 | Fronte et al. | |
| 2008/0072035 A1 | 3/2008 | Johnson | |
| 2008/0091945 A1 | 4/2008 | Princen et al. | |
| 2008/0098226 A1 | 4/2008 | Zokumasui | |
| 2008/0130889 A1 | 6/2008 | Qj | |
| 2008/0130894 A1 | 6/2008 | Qj | |
| 2008/0141023 A1 | 6/2008 | Qi | |
| 2008/0151893 A1 | 6/2008 | Nordmark et al. | |
| 2008/0168135 A1 | 7/2008 | Redlich et al. | |
| 2008/0181406 A1 | 7/2008 | Iyer et al. | |
| 2008/0183992 A1 | 7/2008 | Martin et al. | |
| 2008/0226082 A1 | 9/2008 | Brunet et al. | |
| 2008/0288782 A1 | 11/2008 | Iyer | |
| 2009/0013175 A1* | 1/2009 | Elliott | H04L 63/0428 |
| | | | 709/224 |
| 2009/0019527 A1 | 1/2009 | Winslow | |
| 2009/0034734 A1 | 2/2009 | Owens et al. | |
| 2009/0043901 A1 | 2/2009 | Mizikovsky et al. | |
| 2009/0046858 A1 | 2/2009 | Iyer et al. | |
| 2009/0097661 A1 | 4/2009 | Orsini et al. | |
| 2009/0129388 A1 | 5/2009 | Akhtar et al. | |
| 2009/0177894 A1 | 7/2009 | Orsini et al. | |
| 2009/0178144 A1 | 7/2009 | Redlich et al. | |
| 2009/0198997 A1 | 8/2009 | Yeap et al. | |
| 2009/0228708 A1 | 9/2009 | Trostle | |
| 2009/0249084 A1* | 10/2009 | Ogawa | H04L 9/0897 |
| | | | 713/193 |
| 2009/0254572 A1 | 10/2009 | Redlich et al. | |
| 2009/0254750 A1 | 10/2009 | Bono et al. | |
| 2009/0327617 A1 | 12/2009 | Furuichi et al. | |
| 2010/0010968 A1 | 1/2010 | Redlich et al. | |
| 2010/0115260 A1 | 5/2010 | Venkatesan et al. | |
| 2010/0128874 A1 | 5/2010 | Scott-Nash | |
| 2010/0153702 A1 | 6/2010 | Loveless | |
| 2010/0153704 A1 | 6/2010 | Winslow | |
| 2010/0161981 A1 | 6/2010 | Dodgson et al. | |
| 2010/0169645 A1 | 7/2010 | McGrew et al. | |
| 2010/0198730 A1 | 8/2010 | Ahmed et al. | |
| 2010/0250497 A1 | 9/2010 | Redlich et al. | |
| 2010/0254537 A1* | 10/2010 | Buer | H04L 63/0428 |
| | | | 380/279 |
| 2010/0274861 A1 | 10/2010 | Asiedu | |
| 2010/0278338 A1 | 11/2010 | Chang et al. | |
| 2010/0299313 A1 | 11/2010 | Orsini et al. | |
| 2011/0069835 A1 | 3/2011 | Maliszewski et al. | |
| 2011/0087889 A1 | 4/2011 | Iyer et al. | |
| 2011/0131138 A1 | 6/2011 | Tsuchiya | |
| 2011/0153969 A1 | 6/2011 | Petrick | |
| 2011/0153985 A1 | 6/2011 | Saha et al. | |
| 2011/0154019 A1 | 6/2011 | Wang | |

(56) References Cited

U.S. PATENT DOCUMENTS

| | | |
|---|---|---|
| 2011/0154031 A1 | 6/2011 | Banerjee et al. |
| 2011/0167265 A1 | 7/2011 | Ahuja et al. |
| 2011/0202755 A1 | 8/2011 | Orsini et al. |
| 2011/0246766 A1 | 10/2011 | Orsini et al. |
| 2011/0246785 A1 | 10/2011 | Linsley et al. |
| 2011/0252236 A1* | 10/2011 | De Atley .............. H04L 9/0894 |
| | | 713/168 |
| 2011/0252480 A1 | 10/2011 | Patawaran et al. |
| 2011/0264905 A1 | 10/2011 | Ovsiannikov |
| 2011/0274112 A1 | 11/2011 | Czaszar |
| 2011/0283339 A1 | 11/2011 | Smith |
| 2011/0296440 A1 | 12/2011 | Laurich et al. |
| 2011/0311048 A1 | 12/2011 | Nagata et al. |
| 2012/0011351 A1 | 1/2012 | Mundra et al. |
| 2012/0017095 A1 | 1/2012 | Blenkhorn |
| 2012/0066509 A1 | 3/2012 | Lapp et al. |
| 2012/0072723 A1 | 3/2012 | Orsini et al. |
| 2012/0110316 A1 | 5/2012 | Chamberlain et al. |
| 2012/0124378 A1 | 5/2012 | Chang |
| 2012/0159159 A1* | 6/2012 | Messerges .............. H04L 9/321 |
| | | 713/168 |
| 2012/0159183 A1 | 6/2012 | Adams et al. |
| 2012/0166576 A1 | 6/2012 | Orsini et al. |
| 2012/0166818 A1 | 6/2012 | Orsini et al. |
| 2012/0179916 A1 | 7/2012 | Staker et al. |
| 2012/0198241 A1 | 8/2012 | O'Hare et al. |
| 2012/0204032 A1 | 8/2012 | Wilkins et al. |
| 2012/0210119 A1 | 8/2012 | Baxter et al. |
| 2012/0213360 A1 | 8/2012 | Le Quere |
| 2012/0233472 A1 | 9/2012 | Faraboschi |
| 2012/0246489 A1 | 9/2012 | Brelot |
| 2012/0257506 A1 | 10/2012 | Bazlamacci et al. |
| 2012/0278529 A1 | 11/2012 | Hars |
| 2012/0303826 A1 | 11/2012 | Nelson |
| 2012/0320921 A1 | 12/2012 | Barnes |
| 2012/0324222 A1 | 12/2012 | Massey et al. |
| 2012/0331088 A1 | 12/2012 | O'Hare et al. |
| 2013/0013931 A1 | 1/2013 | O'Hare et al. |
| 2013/0034229 A1 | 2/2013 | Sauerwald |
| 2013/0054979 A1 | 2/2013 | Basmov et al. |
| 2013/0077788 A1 | 3/2013 | Blanchard et al. |
| 2013/0124852 A1 | 5/2013 | Haeger |
| 2013/0138949 A1* | 5/2013 | Furukawa ......... H04W 12/0433 |
| | | 713/153 |
| 2013/0219172 A1 | 8/2013 | Johnson |
| 2013/0254542 A1 | 9/2013 | Buer et al. |
| 2013/0268931 A1 | 10/2013 | O'Hare et al. |
| 2013/0305039 A1 | 11/2013 | Gauda |
| 2013/0311780 A1 | 11/2013 | Besehanic |
| 2013/0326220 A1 | 12/2013 | Connelly et al. |
| 2013/0332724 A1* | 12/2013 | Walters .............. H04L 63/0471 |
| | | 713/153 |
| 2014/0013123 A1 | 1/2014 | Khazan et al. |
| 2014/0013452 A1 | 1/2014 | Aissi et al. |
| 2014/0068262 A1* | 3/2014 | Robertson .......... H04L 63/0428 |
| | | 713/168 |
| 2014/0108782 A1 | 4/2014 | Salinger et al. |
| 2014/0108785 A1 | 4/2014 | Lindteigen et al. |
| 2014/0122866 A1 | 5/2014 | Haeger et al. |
| 2014/0122876 A1 | 5/2014 | Johnson |
| 2014/0122879 A1 | 5/2014 | Johnson |
| 2014/0143533 A1 | 5/2014 | Ganong, III et al. |
| 2014/0143538 A1 | 5/2014 | Lindteigen |
| 2014/0195793 A1 | 7/2014 | Lindteigen |
| 2014/0195798 A1 | 7/2014 | Brugger et al. |
| 2014/0229731 A1 | 8/2014 | O'Hare et al. |
| 2014/0245007 A1 | 8/2014 | Buer et al. |
| 2014/0250300 A1 | 9/2014 | Runkis et al. |
| 2014/0281526 A1 | 9/2014 | Lindteigen |
| 2014/0324698 A1 | 10/2014 | Dolcino et al. |
| 2015/0019443 A1 | 1/2015 | Sheets et al. |
| 2015/0074409 A1 | 3/2015 | Reid et al. |
| 2015/0095645 A1 | 4/2015 | Eldar |
| 2015/0128243 A1* | 5/2015 | Roux ................ H04W 12/0431 |
| | | 726/9 |
| 2015/0154418 A1 | 6/2015 | Redberg |
| 2015/0163229 A1 | 6/2015 | Lindteigen |
| 2015/0188893 A1 | 7/2015 | Sood |
| 2015/0222604 A1 | 8/2015 | Ylonen |
| 2015/0256518 A1 | 9/2015 | Buer et al. |
| 2015/0271151 A1 | 9/2015 | Brugger et al. |
| 2015/0363608 A1 | 12/2015 | Redberg |
| 2015/0363611 A1 | 12/2015 | Redberg |
| 2015/0381710 A1 | 12/2015 | Kish |
| 2016/0056956 A1 | 2/2016 | O'Hare |
| 2016/0219024 A1 | 7/2016 | Verzun et al. |
| 2016/0308680 A1 | 10/2016 | Lindteigen |
| 2017/0019377 A1 | 1/2017 | Lindteigen |
| 2017/0061141 A1 | 3/2017 | Redberg |
| 2017/0075821 A1 | 3/2017 | Takahashi |
| 2017/0083725 A1 | 3/2017 | Takahashi |
| 2017/0085372 A1 | 3/2017 | Anderson et al. |
| 2017/0093587 A1 | 3/2017 | Glisson |
| 2017/0098096 A1 | 4/2017 | Redberg |
| 2017/0118180 A1 | 4/2017 | Takahashi |
| 2017/0118214 A1 | 4/2017 | Vainstein |
| 2017/0126623 A1 | 5/2017 | Lindteigen |
| 2017/0149748 A1 | 5/2017 | Lindteigen |
| 2017/0201382 A1 | 7/2017 | Lindteigen |
| 2017/0286669 A1 | 10/2017 | O'Hare et al. |
| 2017/0359317 A1 | 12/2017 | Anderson et al. |
| 2018/0041485 A1 | 2/2018 | O'Hare et al. |
| 2018/0068125 A1 | 3/2018 | Redberg |
| 2018/0082084 A1 | 3/2018 | Takahashi et al. |
| 2018/0139061 A1 | 5/2018 | Glisson |
| 2018/0176194 A1 | 6/2018 | Xiong |
| 2018/0268173 A1 | 9/2018 | Takahashi et al. |
| 2019/0050348 A1 | 2/2019 | Takahashi et al. |
| 2021/0119979 A1 | 4/2021 | Takahashi |
| 2022/0019699 A1 | 1/2022 | Takahashi |
| 2022/0174050 A1 | 6/2022 | Anderson |
| 2022/0198069 A1 | 6/2022 | Takahashi |
| 2023/0049021 A1 | 2/2023 | Takahashi |
| 2024/0064128 A1 | 2/2024 | Takahashi |
| 2024/0098071 A1 | 3/2024 | Anderson et al. |
| 2024/0104250 A1 | 3/2024 | Takahashi |
| 2024/0311516 A1 | 9/2024 | Takahashi |

FOREIGN PATENT DOCUMENTS

| | | |
|---|---|---|
| EP | 3613195 | 2/2020 |
| EP | 4481609 A2 | 12/2024 |
| JP | 2005-167816 | 6/2005 |
| JP | 2005284525 A | 10/2005 |
| JP | 2012-137975 | 7/2012 |
| JP | 2014-176030 | 9/2014 |
| WO | 2017/048896 | 3/2017 |
| WO | 2017/074887 | 5/2017 |
| WO | 2018/231519 | 12/2018 |

OTHER PUBLICATIONS

Chen, "Data Security and Privacy Protection Issues in Cloud Computing", 2012, IEEE, pp. 647-651 (Year: 2012).*

Vasyltsov et al.; Fast Digital TRNG Based on Metastable Ring Oscillator; 17 pages; Samsung Electronics; Korea.

Blum, Thomas et al. Worcester Polytechnic Institute ECE Department. "Montgomery Modular Exponentiation on Reconfigurable Hardware" Apr. 1999. pp. 1-8, 8 pages.

Carbonite White Paper—"The Better Backup Plan, Making Sense of the Cloud"; 5 pages.

Carbonite White Paper—"The Better Backup Plan, Trouble Free Backup Solutions"; 3 pages.

Korean Intellectual Property Office; International Patent Application No. PCT/US2016/058568, International Search Report and Written Opinion, Jan. 20, 2017; 9 pages; Korea.

Korean Intellectual Property Office; International Patent Application No. PCT/US2016/051834, International Search Report and Written Opinion, Dec. 21, 2016; 11 pages; Korea.

(56) References Cited

OTHER PUBLICATIONS

McIvor et al. The Institute of Electronics, Communications and Information Technology (ECIT) "High-Radix Systolic Modular Multiplication on Reconfigurable Hardware." 2005. pp. 13-18, 6 pages.
Nedjah, Nadia et al. State University of Rio de Janeiro, Department de Systems of Engineering and Computation. "Systolic Hardware Implementation for the Montgomery Modular Multiplication." 6 pages.
U.S. Appl. No. 14/198,097, filed Mar. 5, 2014, entitled "Multi-Level Independent Security Architecture," by Richard J. Takahashi.
U.S. Appl. No. 14/208,337, filed Mar. 13, 2014, entitled "Multi-Tenancy Architecture," by Richard J. Takahashi.
U.S. Appl. No. 14/217,912, filed Mar. 18, 2014, entitled "Removable or Replaceable Physical Interface Input/Output Module," by Richard J. Takahashi.
U.S. Appl. No. 14/219,651, filed Mar. 19, 2014, entitled "Secure End-To-End Communication System," by Richard J. Takahashi.
U.S. Appl. No. 14/177,392, filed Feb. 11, 2014, entitled "Security Device With Programmable Systolic-Matrix Cryptographic Module and Programmable Input/Output Interface," by Richard J. Takahashi.
Wikipedia; Hardware Security Module; 6 pages.
The International Bureau of WIPO; PCT International Preliminary Report on Patentability, Issued for PCT/US2016/058568; May 11, 2018; 5 pages; Europe.
The International Bureau of Wipo; PCT International Preliminary Report on Patentability, Issued for PCT/US2016/051834; Mar. 20, 2018; 9 pages; Europe.
Korean Intellectual Property Office; International Patent Application No. PCT/US2018/035052, International Search Report and Written Opinion, Sep. 11, 2018; 11 pages; Korea.
European Patent Office; Extended European Search Report, issued in connection to EP16847265.2; Feb. 11, 2019; 11 pages; Europe.
Israeli Patent Office; Office Action issued in connection to application No. 258095; Dec. 17, 2019; 5 pages; Israel.
The International Bureau of WIPO; PCT International Preliminary Report on Patentability, issued in connection to PCT/US2018/035052; Dec. 17, 2019; 9 pages; Switzerland.

Australian Government, IP Australia; Examination Report No. 1 for Standard Patent Application, issued in connection to application No. 2016323147; Mar. 25, 2020; 5 pages; Australia.
European Patent Office; Extended European Search Report, issued in connection to EP18816604.5; Mar. 18, 2020; 8 pages; Europe.
Japanese Patent Office; Office Action Summary, issued in connection to application No. 2018-534774; Oct. 6, 2020; 4 pages; Japan.
European Patent Office; Communication Pursuant to Article 94(3) EPC, issued in connection to application No. EP16847265.2; Oct. 12, 2020; 6 pages; Europe.
Menezes, A. et al.; Chapter 7: Block Ciphers ED; Handbook of Applied Cryptography; Oct. 1, 1996; 223-282 pages; CRC Press Series on Discrete Mathematics and its Applications; CRC Press.
Jang-Jaccard et al.; Portable Key Management Service for Cloud Storage; Oct. 2012; IEEE; pp. 147-156.
European Patent Office; Communication Pursuant to Article 94(3) EPC, issued in connection to application No. 18816604.5; Dec. 21, 2021; 6 pages; Europe.
European Patent Office; Summons to Attend Oral Proceedings Pursuant to Rule 115(1) EPC; Feb. 21, 2022; 7 pages; Europe.
Australian Government, IP Australia; Examination Report No. 1 for Standard Patent Application, issued in connection to application No. 2021201714; May 19, 2022; 3 pages; Australia.
Canadian Intellectual Property Office; Examiner's Report, issued in connection to application No. 2997125; Dec. 29, 2022; 4 pages; Canada.
European Patent Office; Communication pursuant to Article 94(3) EPC, issued in connection to application No. 18816604.5; Feb. 22, 2023; 6 pages; Europe.
Japanese Patent Office; Office Action Summary, issued in connection to application No. 2021-176856; Nov. 8, 2022; 6 pages; Japan.
Canadian Intellectual Property Office; Examiner's Report, issued in connection to application No. 2997125; Nov. 8, 2023; 4 pages; Canada.
Canadian Intellectual Property Office; Office Action, issued in connection to application No. 3066728; Nov. 29, 2024; 3 pages; Canada.
Japan Patent Office; Notice of Reasons for Refusal, issued in connection to application No. 2023-091525; 11 pages; Aug. 27, 2024; Japan.

* cited by examiner

SECURE END-TO-END COMMUNICATION SYSTEM

RELATED APPLICATIONS

This application is a continuation application and claims the benefit and priority benefit of U.S. patent application Ser. No. 15/163,150, filed May 24, 2016, entitled "SECURE END-TO-END COMMUNICATION SYSTEM," which is a continuation application and claims the benefit and priority benefit of U.S. patent application Ser. No. 14/219,651, filed Mar. 19, 2014, now issued as U.S. Pat. No. 9,374,344, entitled "SECURE END-TO-END COMMUNICATION SYSTEM," which itself claims priority to U.S. Provisional Application Ser. No. 61/806,757, filed Mar. 29, 2013, entitled "SECURE END-TO-END COMMUNICATION LINK SYSTEM WITHOUT TRADITIONAL VPN-IP-SEC," by Richard J. Takahashi, the entire contents of which applications are incorporated by reference as if fully set forth herein.

This application is related to U.S. Non-Provisional application Ser. No. 14/208,337, filed Mar. 13, 2014, entitled "MULTI-TENANCY ARCHITECTURE," by Richard J. Takahashi, the entire contents of which application is incorporated by reference as if fully set forth herein.

This application is related to U.S. Non-Provisional application Ser. No. 14/198,097, filed Mar. 5, 2014, entitled "MULTI-LEVEL INDEPENDENT SECURITY ARCHITECTURE," by Richard J. Takahashi, the entire contents of which application is incorporated by reference as if fully set forth herein.

This application is related to U.S. Non-Provisional application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, the entire contents of which application is incorporated by reference as if fully set forth herein.

FIELD OF THE TECHNOLOGY

At least some embodiments disclosed herein relate to security processing and secure communication in general, and more particularly, but not limited to, a secure end-to-end communication system using security processing.

BACKGROUND

The virtual private network (VPN) of today requires an IPsec transaction to set-up the keys and the encryption link. Once established, the VPN and the IP addresses are fixed. VPN technology is over 25 years old with many limitations as applied to the dynamic mobile world. In today's network consisting of multiple variant cellular-mobile networks (e.g., 2G, 3G, 4G, etc.) mixed with older PTSN and POTS networks, VPN technology is costly to support and has serious drawbacks and cannot maintain a VPN connection (e.g., if the end user is moving) using mobile devices (e.g., laptops, smartphones, tablets, etc.).

Typically, the mobile 3/4G network data channel changes (on and off) as the mobile network allocates bandwidth to thousands of other users on the network. As a result, the IPsec connection will "break" and need to be re-established. Service providers are charging premium rates for VPN usage because it requires a fixed IP address and fixed data channel and bandwidth.

SUMMARY OF THE DESCRIPTION

Systems and methods to provide a secure end-to-end communication system with security processing of data (e.g., encryption and decryption of data packets) using one or more security devices are described herein. Some embodiments are summarized in this section.

In one embodiment, a method includes: loading, by a key manager, a first set of keys into a security device; encrypting first data with the first set of keys using the security device; and sending, over a network, the encrypted first data to an external site or a mobile device. The method may further include: requesting the encrypted data from the external site or mobile device; receiving, over the network, the encrypted first data; and decrypting the received encrypted first data with the first set of keys using the security device.

In one embodiment, a method includes: loading, by a first key manager, a first set of keys into a first security device; decrypting, by the first security device using the first set of keys, first data obtained from a data storage; encrypting, by a second security device, the first data using a second set of keys; and sending the encrypted first data over a network.

In one embodiment, a system includes: a security device, coupled to receive first data from an internal network, the security device configured to encrypt the first data with a first set of keys, and to provide the encrypted first data for sending (e.g., via transport network equipment) over a network to a mobile device (e.g., a mobile phone, tablet, or portable computer) or an external site (e.g., a data storage center or common encrypted data storage); and a first key manager configured to load the first set of keys into the security device. The user (e.g., a manufacturing or services company, or a customer of a data storage center or other cloud service) of the security device may control the first key manager, for example, remotely by sending commands over the Internet or another internal or external network.

In one embodiment, a system includes a security device, configured for cryptographic processing, coupled to receive incoming data from a plurality of data sources (e.g., data from different companies, or other different customers or users), wherein the incoming data includes first data from a first data source; a controller (e.g., a key manager) configured to select a first set of keys from a plurality of key sets, each of the key sets corresponding to one of the plurality of data sources, wherein the first set of keys is used by the security device to encrypt the first data; and a common encrypted data storage, coupled to receive the encrypted first data from the security device.

In one embodiment, a system includes a plurality of security devices, each configured for cryptographic processing, coupled to receive incoming data from at least one data source; and a plurality of key managers, each key manager associated with a user, each key manager coupled to a respective one of the security devices, and each key manager configured to provide a set of keys to the security device for encryption of incoming data associated with the respective user, wherein the incoming data is to be stored in a common encrypted data storage after the encryption.

In one embodiment, a security device includes a plurality of cryptographic cores (e.g., a core configured using a systolic array) including an input core configured to perform encryption for a first data packet; at least one key cache storing a plurality of key sets, wherein a first set of keys is selected from the plurality of key sets to encrypt the first data packet by the input core; and a packet input engine configured to detect a header of the first data packet and to address the first set of keys. In one embodiment, the keys are initially provided to the security device by an external key manager through an application programming interface.

The disclosure includes methods and apparatuses which perform the above. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
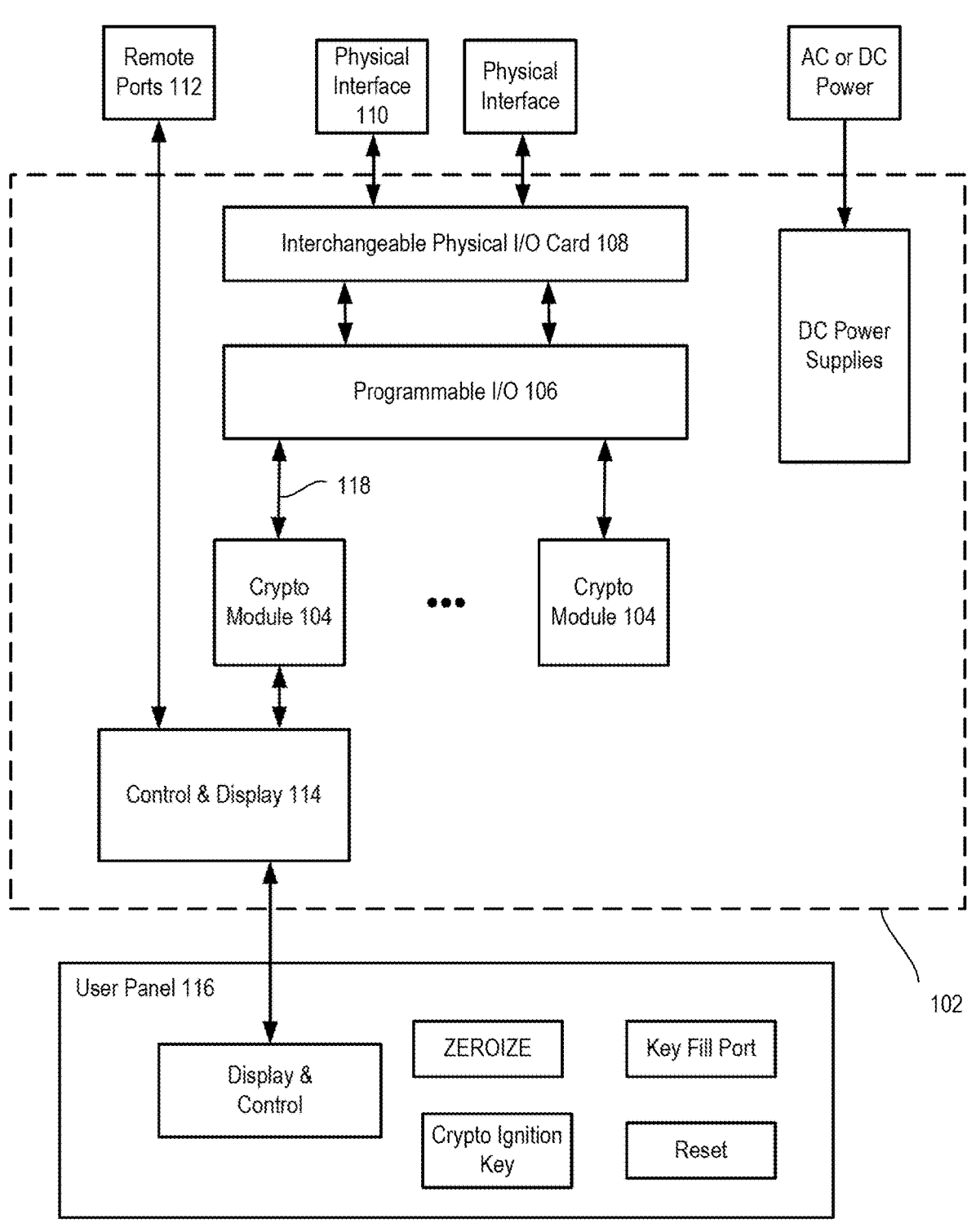
FIG. 1 shows a security processing system including a security device with a plurality of programmable cryptographic modules and a programmable input/output interface, according to one embodiment.

FIG. 1 shows a security processing system including a security device 102 with a plurality of programmable cryptographic modules 104 and a programmable input/output interface 106, according to one embodiment. An interchangeable physical interface 108 is configured to receive a plurality of incoming packets from a data source (e.g., through physical interface 110). In one embodiment, the plurality of cryptographic modules is configured using at least two systolic layers for processing of packets, control data, and keys as discussed further below.

Programmable input/output interface 106 is coupled to the interchangeable physical interface and is configured to route each of the plurality of incoming packets to one of the cryptographic modules 104 for encryption to provide a plurality of encrypted packets. The programmable input/output interface 106 is configured to route the encrypted packets to a common internal or external data storage.

For outgoing packets, programmable input/output interface 106 routes encrypted packets to one of the cryptographic modules 104 for decryption. The decrypted packets are then routed by programmable input/output interface 106 to the data source.

In one embodiment, programmable input/output interface 106 is programmable to support different interface protocols, and each of the plurality of cryptographic modules 104 is programmable to support different encryption protocols (e.g., each module 104 may be programmed to support a different protocol). Programmable input/output interface 106 may include one or more field-programmable gate arrays that are programmable to support the different interface protocols. In one embodiment, programmable input/output interface 106 may be coupled to the cryptographic modules 104 by a high-speed bus such as, for example, a PCI-e bus.

In one embodiment, the interchangeable physical interface 108 is configurable to support two different physical interfaces. In one example, the interchangeable physical interface 108 comprises a replaceable physical input/output panel (or card) that can be replaced independently of the programmable input/output interface 106 and the plurality of cryptographic modules 104.

FIG. 1 also illustrates a control and display unit 114 coupled to control operation of cryptographic modules 104, and also to send or receive data over remote ports 112. Remote ports 112 may be, for example, RS-232, USB, or GigEthernet ports. Remote ports 112 may implement communications using, for example, an SNMP protocol.

Control and display unit 114 provides drivers to a display and status control screen on the user panel 116. User panel 116 also provides soft or hard buttons for user control and data input during the operation of security device 102. Various functions controllable on user panel 116 include a zeroize control (to zeroize the keys), a crypto ignition key (to start the encryption process), a key fill port (to load the keys), and a system reset.

In one embodiment, security device 102 (which may be, e.g., implemented as a security appliance) is used to prevent data breaches by a hacker trying to gain access to encrypted data. In this embodiment, security device 102 provides security, encryption, high-assurance, high-availability sustained bandwidths up to 400 Gbs (full duplex), programmability for data-at-rest and in-network applications. The security device 102 has an interchangeable I/O flexible module as described above to support different physical (PHY) interface connectors and electronics.

In one embodiment, use of the interchangeable I/O interface 108 and programmable I/O interface 106 (implemented using an FPGA I/O systolic array) provides the following advantages:

1) The FPGA I/O systolic array can be programmed for different interfaces and the interchangeable I/O is designed with the selected interface's physical electronics and connectors. This permits the main physical chassis of security device 102 to remain unchanged and to readily use different interface options that can be changed by a user.

2) The security device architecture in conjunction with the interchangeable I/O provides a high-density connectors capability. These flexible I/O design features can be programmed for many different types of interfaces to maximize interfacing flexibility to an end network application.

3) Scalable performance in programmable specified data rate increments for each cryptographic module up to, e.g., six modules which will have up to six times the programmed full duplex data rates. Other lesser or greater numbers of cryptographic modules may be used in other designs.

In one embodiment, flexible I/Os and flexible cryptographic (sometimes simply referred to as "crypto" herein) modules are accomplished by using a scalable systolic architecture and crypto-modules and interchangeable input/ output (I/O) card, as described herein. The security device 102 has programmable delay latencies for a specified data block size of programmable bytes sizes. The security device architecture has two programmable elements: the programmable crypto-module and the programmable flexible I/O.

In one embodiment, the flexible I/O has two components: The FPGAs can be programmed to support different interface protocols, and an interchangeable physical I/O card is used to support the physical interfaces and connectors. The flexible I/O also has a switching network. The scalable and programmable crypto-module has a programmable full duplex bandwidth consisting of high performance CPUs and FPGAs clocking up to maximum allowable clock rates internal to the FPGA. This CPU and FPGA in systolic-matrix configuration and implementation provides a fully-programmable system to meet many different applications.

In one embodiment, the security device crypto-module design will be using high performance CPU or equivalent processors and FPGAs forming a programmable systolic scalable module. The programmability efficiencies of design are realized by segmenting functional subsystems from packet engines, crypto engines, key handler and overhead-control management engines. The I/O interface incorporates functional blocks (e.g., 100 Gbs Ethernet, PCI-express, Fibre channel, SAS, Infiniband, SCSI, or any other high speed interface protocols) that are incorporated.

In one embodiment, the security device 102 can be both a media-level encryptor and a file system encryptor. All data payload passing thru security device 102 is encrypted except for the file system headers-commands (which remain in the clear). Therefore, the existing file system will be intact with no drivers required for the end system. The only interface required is for the end system remote management and key management products. This makes the security device transparent to a user or network storage system.

Figure 2:
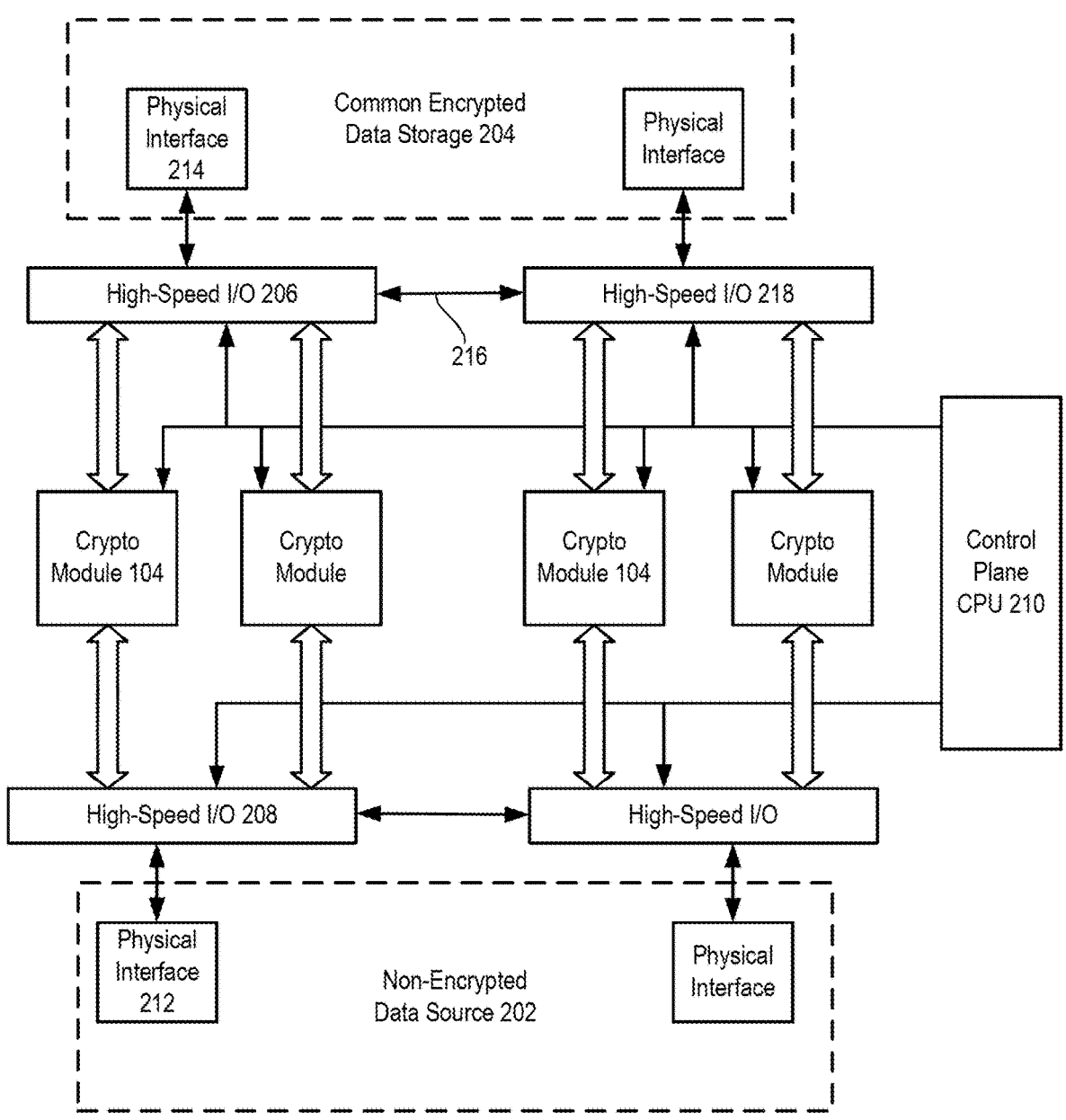
FIG. 2 shows a systolic-matrix security processing system for receiving and encrypting data packets from a non-encrypted data source, and concurrently processing control and data from a control plane for storage in a common encrypted data storage, according to one embodiment.

FIG. 2 shows a security processing system for receiving and encrypting data packets from a non-encrypted data source 202 for storage in a common encrypted data storage 204, according to one embodiment. The system includes cryptographic modules 104. Each cryptographic module is coupled between programmable high-speed input/output (I/O) interfaces 206 and 208, which are each coupled to an interchangeable physical interface (see, e.g., interface 108 in FIG. 1). In one embodiment, interfaces 206 and 218 communicate with each other during security data processing using, for example, a serial bus 216 (e.g., an Interbus serial bus).

Processor 210 handles control plane and data processing for the cryptographic modules 104 and the high-speed input/output interfaces 206, 208, 218. In one embodiment, processor 210 is a control plane processor configured to control systolic data flow for the cryptographic modules 104, and also to control loading of keys from an external key manager to an internal key cache (see, e.g., FIG. 9 below).

Physical interface 212 receives a plurality of incoming packets from data source 202. The first programmable high-speed input/output interface 208 routes each of the plurality of incoming packets to one of the cryptographic modules 104 for encryption processing to provide encrypted packets. The second programmable high-speed programmable input/output interface 206 routes the encrypted packets from the cryptographic module 104 to common encrypted data storage 204 via physical interface 214.

In one embodiment, the routing and switching functions of high-speed interfaces 206 and 208 are provided by programmable input/output interface 106 of FIG. 1. In one embodiment interchangeable physical input/output interface 108 includes physical interface 212 and/or 214.

In one embodiment, each of the encrypted packets has a respective tag to identify an original entry port (e.g., a port of high-speed I/O interface 208), keys or key addresses associated with each of the encrypted packets is decrypted by one of the cryptographic modules to provide corresponding decrypted packets, and the first programmable input/ output interface 208 is further configured to use the respective tag to route each decrypted packet back to its original entry port.

In one embodiment, each programmable input/output interface 206, 208, 218 is programmable to support different interface protocols. For example, the first programmable input/output interface 208 may include a plurality of field-programmable gate arrays that are programmable to support the different interface protocols.

In one embodiment, the first programmable input/output interface 208 and the second programmable input/output interface 206 each comprise a switching network and a router (not shown) to route incoming packets (from data source 202 or data storage 204, respectively) to one of the cryptographic modules 104.

In one embodiment, each cryptographic module 104 is designed and programmed, and mathematically optimized for any cryptographic algorithms and network IP protocols. The design can be scaled up to, for example, six or more crypto modules. The security device 102 can be mathematically optimized, for example, for any cryptographic algorithms for full-duplex data rate performance.

In one embodiment, the security device architecture is adaptable to any enterprise class data-at-rest or IP network solution due to the flexible switching I/O architecture. The flexible input and output switching I/O interfaces provide a significant cost advantage and homogeneous data flow and relax the need for data separation. The security device may use FPGAs that bridge to the native I/O interface for the required number of crypto-modules. This allows a single crypto-module to be used with many possible system implementations and configurations based on the end application I/O type and throughput requirements and also be scalable with programmable data rate increments.

In one embodiment, the flexible switch I/O architecture described herein includes programmable I/O modules (using FPGAs) that function as a low latency bridge and switch between the native I/O to the target data-at-rest system and to the internal array of crypto-module processors. A pair of separated, designated programmable FPGA-based I/O interface modules bridges security device 102 to an industry standard network. This scalability and flexibility enables security device 102 to be inserted into existing or new storage network systems supporting scalable data rates.

In one embodiment, the flexible programmable I/O interface is adaptable to any enterprise, or mobile, class data-at-rest interface application. The flexible I/O architecture includes programmable I/O modules (using FPGAs) that function as a low latency bridge between the native I/O of the target data-at-rest system and the internal array of crypto-modules. Flexible I/O programmability is based on FPGA-based modules that can be programmed to any industry standards or a custom interface to the storage system fabric or IP network.

In one embodiment, security device 102 performs at data rates only limited by the technology used. The key-handling agility is matched to the data rates. The internal key management is central to the performance of the cryptographic module in this embodiment.

Figure 3:
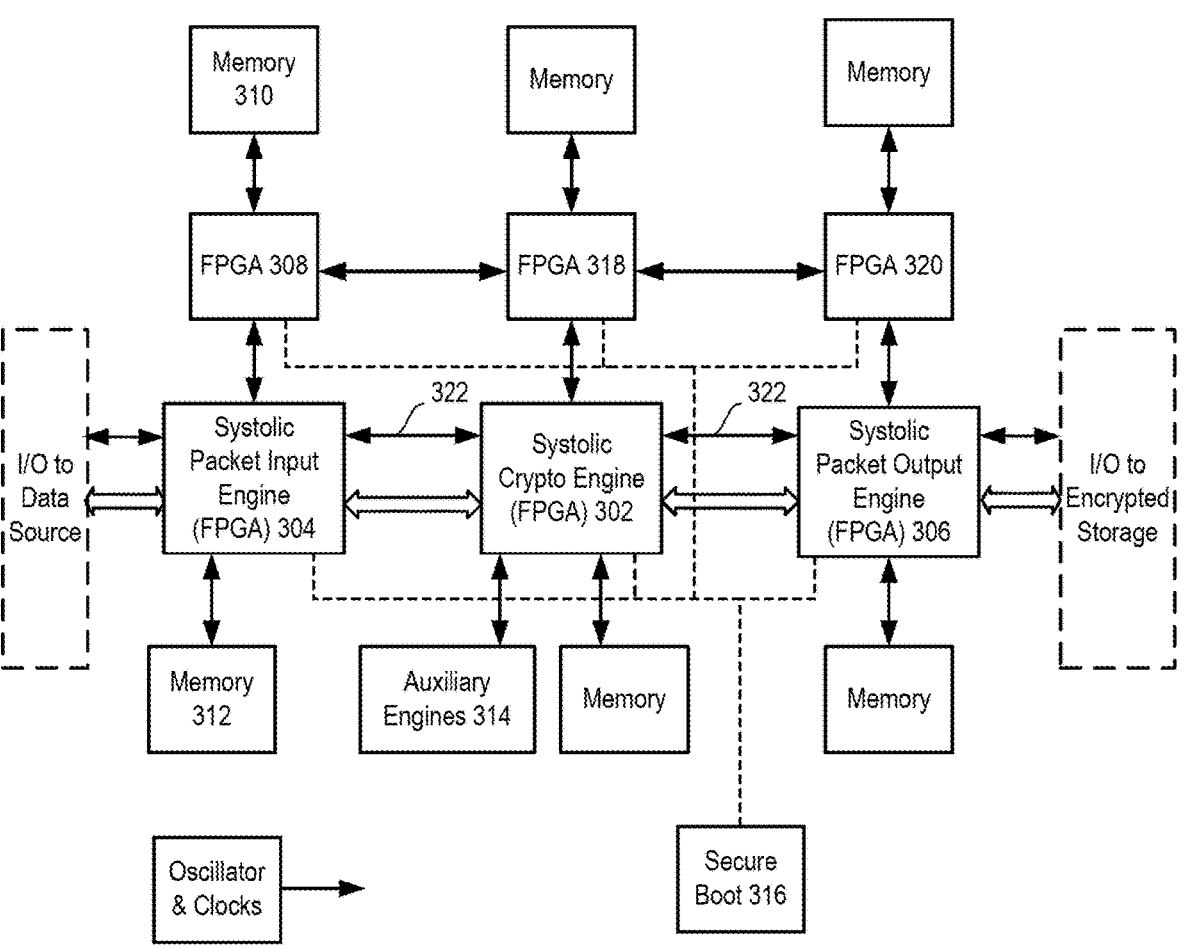
FIG. 3 shows a systolic-matrix cryptographic module including programmable input and output packet engines and a programmable cryptographic processing engine, according to one embodiment.

FIG. 3 shows a cryptographic module 104 including programmable input and output packet engines and a programmable cryptographic processing engine, according to one embodiment. More specifically, cryptographic module 104 comprises a programmable packet input engine 304, a programmable cryptographic engine 302, and a programmable packet output engine 306. In one embodiment, packet engines 304 and 306 are coupled to cryptographic engine 302 using a high-speed serial or parallel bus 322 (e.g., an Interbus bus) for control operations, and using high-speed data busses for data transfer.

In one embodiment, the programmable packet input engine 304, the programmable cryptographic engine 302, and the programmable packet output engine 306 are each configured as a systolic-matrix array and each include one or more field-programmable gate arrays (FPGAs) programmable to support different security protocols. In one example, the programmable packet input engine 304, the programmable cryptographic engine 302, and the programmable packet output engine 306 are each coupled to a respective dedicated program memory for each FPGA (e.g., memory 310 or 312), and to a respective dedicated processor (not shown) to control programming of each FPGA. Each memory 310, 312 may be used, e.g., to provide data, keys buffering and/or storage.

In a method according to one embodiment, the first programmable input/output interface 208 (see FIG. 2) includes a field-programmable gate array (FPGA), and the method includes programming the FPGA to support a different interface protocol than previously used for receiving incoming data packets. In this method, each of the plurality of cryptographic modules 104 includes programmable systolic packet input engine 304, programmable systolic-matrix cryptographic engine 302, and programmable systolic-matrix packet output engine 306. The method further includes programming an FPGA of the packet input engine 304, an FPGA of the cryptographic engine 302, and an FPGA of the packet output engine 306.

In one embodiment, a top systolic layer includes FPGAs 308, 318, and 320, which are coupled to systolic packet engines 304, 306 and cryptographic engine 302, each also including an FPGA, in order to form a two-dimensional systolic-matrix array for data and control processing.

In one embodiment, each crypto module 104 has input and output packet engines and the crypto core. The crypto module has a systolic crypto engine that is tightly coupled to the input and output systolic packet engines. Each element in the crypto module has a dedicated high-performance CPU plus its memory, and dedicated memory to the input-output systolic packet engines and crypto core buffer/storage memory.

In one embodiment, each FPGA(s) array has a dedicated program memory. Also, a compression engine (included, e.g., in auxiliary engines 314) is included for data compression or other data processing required.

In one embodiment, the crypto module of FIG. 3 uses secure boot 316 to verify the FPGA code and that any software (SW) within the crypto module is encrypted-secure and authenticated. During the secure boot process, if any anomalies are detected, the system will not boot and further may provide a user alert that issues have been detected. The secure boot 316 may be designed to work with existing industry key manager systems.

In one embodiment, the crypto module design of FIG. 3 provides features such as hard-wired, one-time programmable options and custom analog/digital circuits for flexible physical partitioning for un-encrypted (plain text) and encrypted (cipher text) separation.

Figure 4:
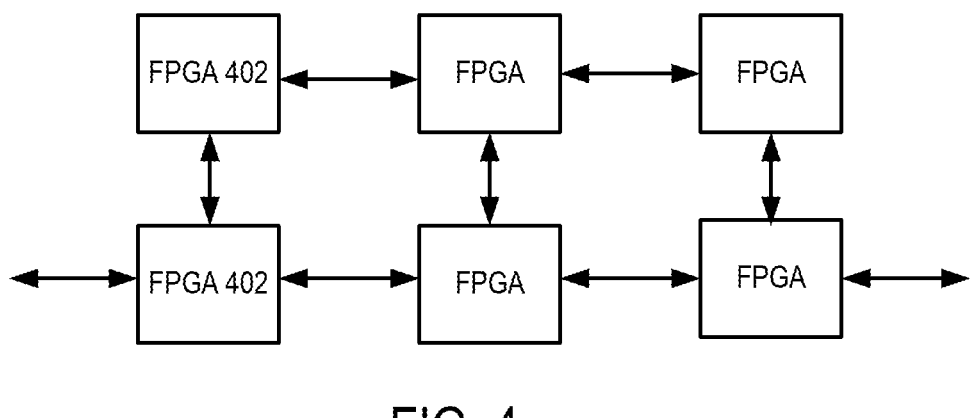
FIGS. 4 and 5 each show an example of a systolic-matrix array with two-dimensional computing paths, according to various embodiments.
Figure 5:
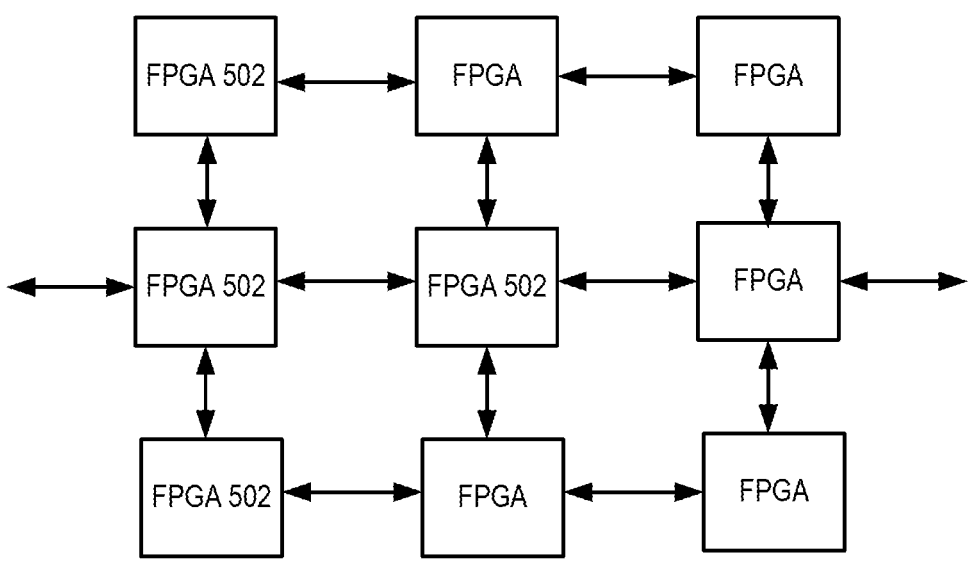

FIGS. 4 and 5 each show an example of a systolic-matrix array with two-dimensional computing paths, according to various embodiments. FIG. 4 shows FPGAs 402 organized in a systolic-matrix array for data, keys and control processing of security packets. Although FPGAs are shown forming the systolic-matrix array in FIG. 4, other forms of programmable devices, or other types of data processing units or processors may be used to form the systolic-matrix array in other embodiments (e.g., ASICs may be used). FIG. 5 shows an alternative configuration for systolic-matrix array comprising FPGAs 502 for data control processing of security packets.

In one embodiment, each cryptographic module 104 is implemented using a systolic-matrix array configuration. For example, cryptographic module 104 as illustrated in FIG. 3 is configured in a systolic-matrix array such as the basic form illustrated in FIG. 4. In addition, in one embodiment, the input and output packet engines 304, 306 and/or the cryptographic processing engine 302 for each cryptographic module 104 are also each themselves designed with an internal systolic-matrix array architecture. For example, the cryptographic processing engine 302 may be configured in a systolic-matrix array configuration such as illustrated in FIG. 5. In another example, each packet engine may itself have the systolic array configuration of FIG. 4 or FIG. 5, or yet other systolic array configurations, as part of its internal sub-block processing architecture.

Thus, as described above, in some embodiments, security device 102 is configured with a two or greater multiple-layer systolic-matrix array architecture. In this architecture, each cryptographic module 104 has a systolic-matrix array configuration (i.e., a top systolic array layer), and each of the packet engines and/or cryptographic processing engine has an internal systolic-matrix array configuration (e.g., in a lower systolic array layer formed of FPGAs that is logically underneath the top systolic-matrix array layer). The multiple-layers above combined with two-dimensional systolic arrays provides a three-dimensional systolic-matrix architecture for security device 102.

Figures 6, 7:
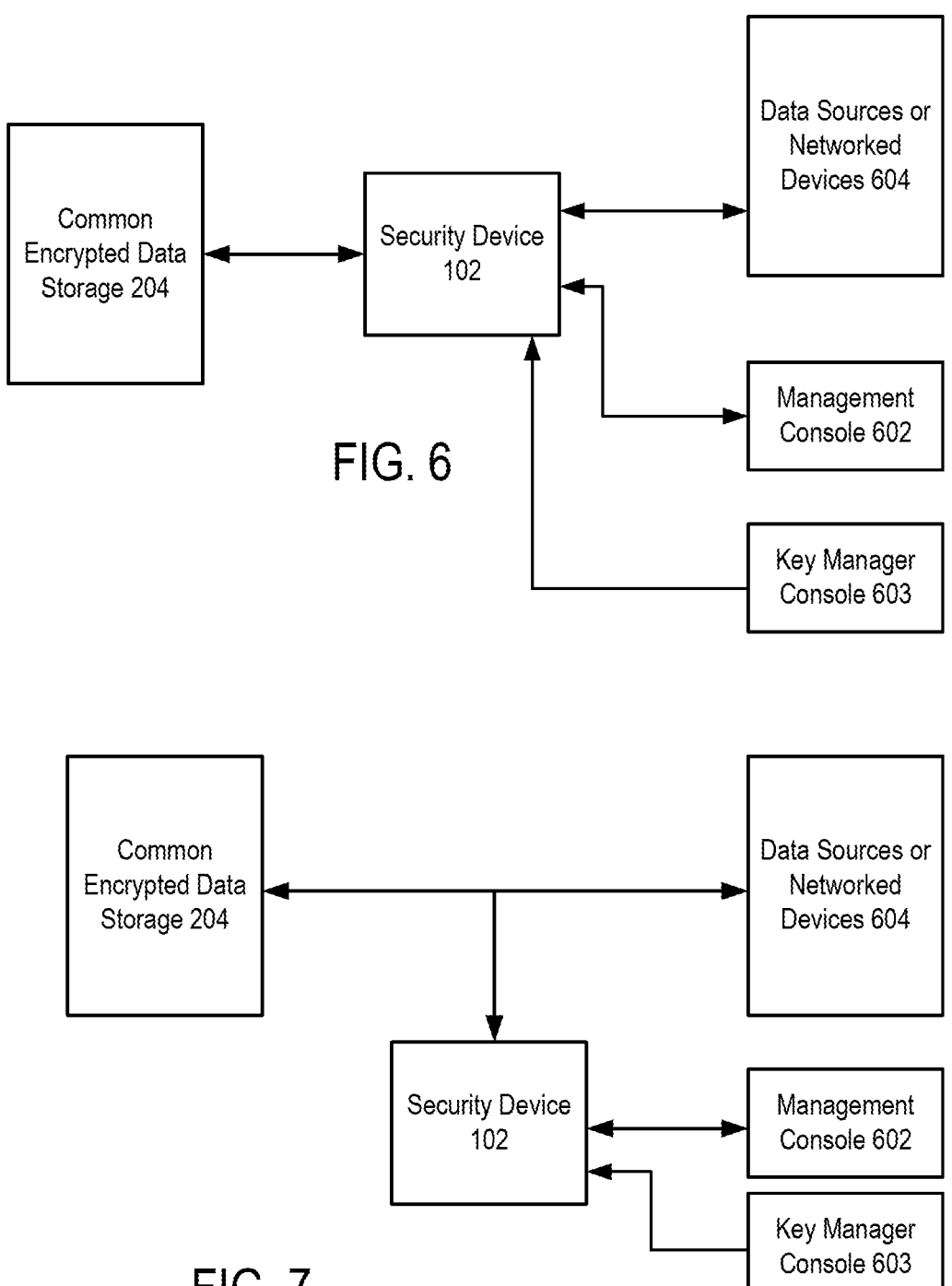
FIG. 6 shows a security device implemented between a data source and encrypted data storage using an in-line configuration, according to one embodiment.
FIG. 7 shows a security device implemented between a data source and encrypted data storage using a side-car configuration, according to one embodiment.

FIG. 6 shows security device 102 implemented between a data source 604 and encrypted data storage 204 using an in-line configuration, according to one embodiment. In one example, security device 102 is installed as an enterprise high-performance data storage encryption and authentication appliance. The security device is installed as in-line (bump in the wire) between the data storage arrays. Security device 102 also interfaces with management console 602 and external key manager console 603.

FIG. 7 shows security device 102 implemented between data source 604 and encrypted data storage 204 using a side-car configuration, according to one embodiment. In one example, security device 102 is installed as a data storage encryption and authentication appliance as side car (off to the side of the data storage). Security device 102 also interfaces with management console 602 and external key manager console 603.

Figure 8:
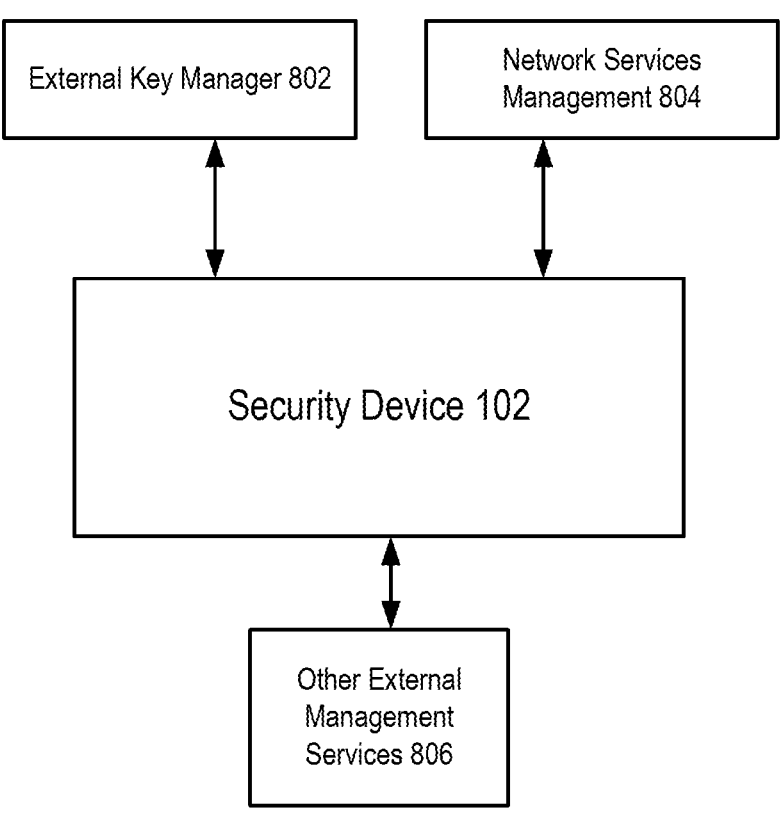
FIG. 8 shows a security device interfacing with external and network services, according to one embodiment.

FIG. 8 shows security device 102 interfacing with external and network services, according to one embodiment. In particular, security device 102 is interfaced with a management console consisting of external key manager 802, network services management 804, and any other required external management services 806.

Figure 9:
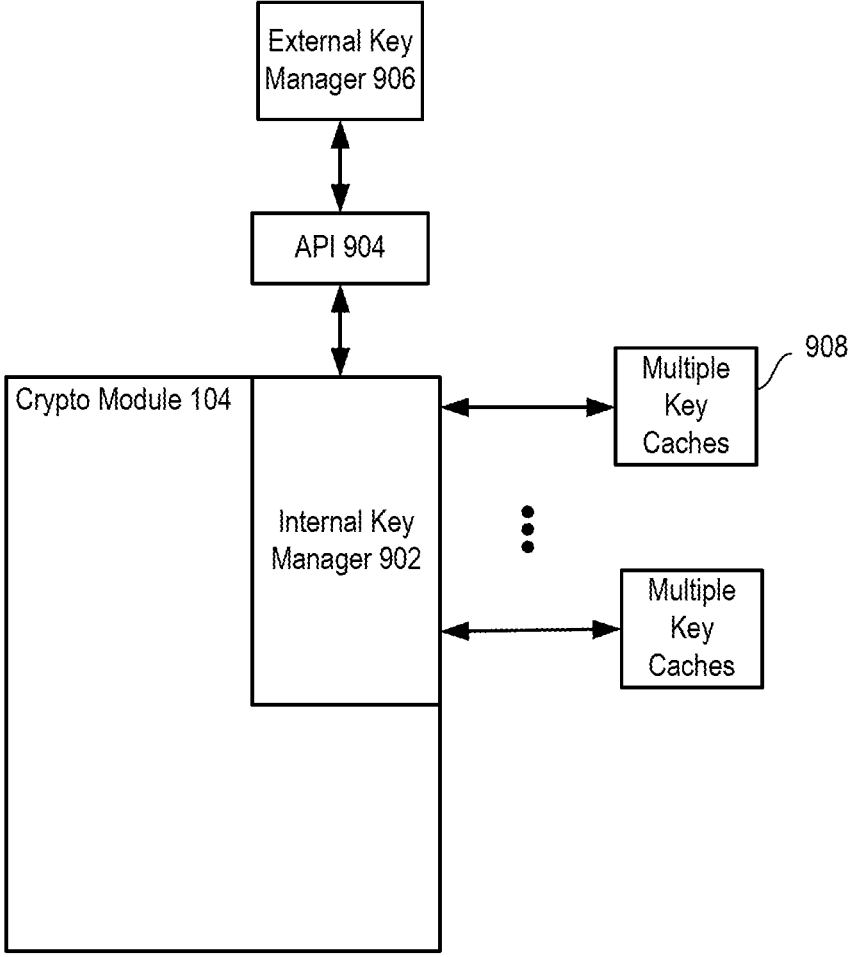
FIG. 9 shows an internal key manager of the cryptographic module that communicates with an external key manager via an application programming interface, according to one embodiment.

FIG. 9 shows an internal key manager 902 of cryptographic module 104 that communicates with an external key manager 906, according to one embodiment. Each of the plurality of cryptographic modules 104 comprises internal key manager 902, which is coupled via an application programming interface (API) 904 to external key manager 906. Keys received via API 904 are stored in one of multiple key caches 908 for use by the cryptographic modules 104 during encryption or decryption of incoming packets. In one embodiment, control plane processor 210 controls loading of the keys from API 904 to one of key caches 908.

In one embodiment, each of the incoming packets to a cryptographic module 104 includes a key tag to identify at least one key associated with the packet to be security processed, and further may also include a source tag to identify a data source and keys for the packet. The internal key manager 902 is configured to retrieve the keys from one of key caches 908 using the key tag for the packet to be processed by the respective cryptographic module 104.

In one embodiment, programmable input/output interface 106, 206, and/or 208 is further configured to route a packet to one of the plurality of cryptographic modules 104 based on the source tag.

In one embodiment, each of the plurality of cryptographic modules 104 may be physically partitioned from the other of the cryptographic modules. In one embodiment, other key features of security device 102 may include the ability to interface or port third party key management software and network management software.

Various additional, non-limiting embodiments of security device 102 are now described below. In one or more embodiments, security device 102 may provide one or more of the following advantages:

1. A fast data rate encryptor at hundreds of gigabits full duplex (e.g., for meeting future optical network data rates).

2. A programmable systolic architecture consisting of FPGAs and CPUs. The security device is flexible and programmable requiring only software upgrades for different versions and features.

3. Multi-tenancy to secure an entity's or individual user's data. Each entity/user's data will be encrypted/decrypted using a unique key per the entity/user. In this way, each entity/user's data will be uniquely encrypted/decrypted and stored in a common data storage area. If by operator or machine error the wrong data is accessed and mistakenly sent to another of the entity/users using the storage area, the data is still safe since it will not be decrypted by the correct entity/user key. Various embodiments for a multi-tenancy architecture are discussed below in the section titled "Multi-Tenancy Architecture".

4. A multi-level security architecture to secure different levels of classified data using a single security device (e.g., an encryptor). Each classification of data will be encrypted/decrypted using a unique key per the data class. In this way, each classification of data will be uniquely encrypted/decrypted and stored in a common storage area. If by operator or machine error the wrong data is accessed and mistakenly sent to another level of classification, the data is still safe since it is not decrypted by the correct user key.

5. A high-speed key agility and storage for millions of keys.

6. A flexible high-density I/O to interface to network equipment at multiple customer (or other source) sites. Also, the flexible I/O can be programmed for mixed interface types (e.g., 10 Gbs Ethernet, Infiniband, or PCI-express), thus requiring no interface bridging network equipment.

7. A replaceable, flexible I/O physical panel that can be customized for a specific network installation without the need to re-design the main chassis of security device 102.

8. A secure boot to protect, authenticate the CPUs, FPGAs firmware and software (SW) codes.

Figure 10:
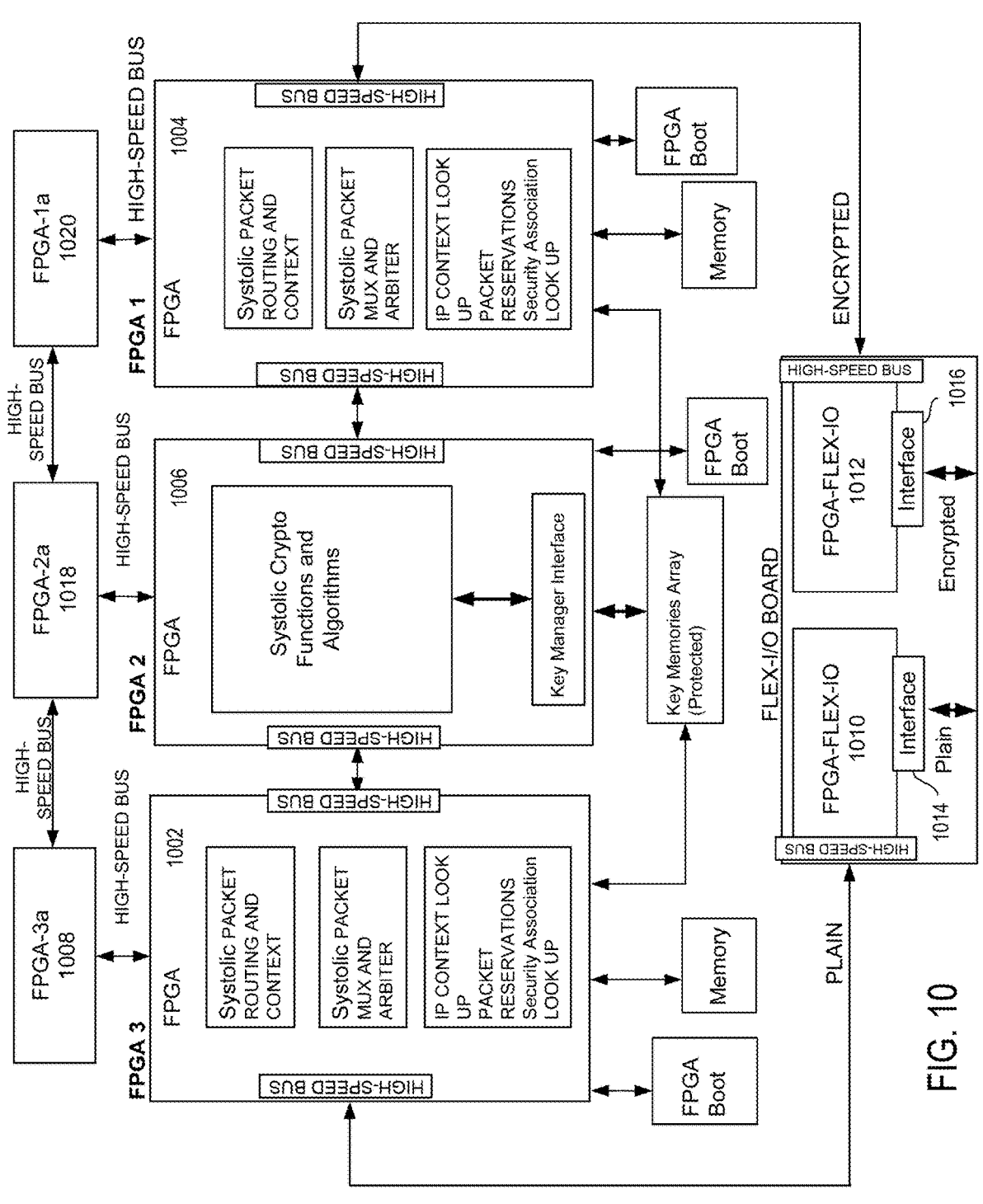
FIG. 10 shows a specific implementation of a programmable cryptographic module configured as a systolic array of FPGAs, according to one embodiment.

FIG. 10 shows a specific implementation of a programmable cryptographic module configured as a systolic-matrix array of FPGAs, according to one embodiment. In particular, the system of FIG. 10 is an exemplary implementation of cryptographic module 104 as was discussed for FIG. 3 above.

Specifically, un-encrypted or plain text data (e.g., incoming data packets) enters physical interface 1014 and is routed by programmable input interface 1010 to packet input engine 1002. Data packets are routed by input engine 1002 to an appropriate cryptographic core in cryptographic processing engine 1006.

A security association (SA) key lookup is used in packet engine 1002 or 1004 to determine appropriate keys for loading from a key memories array to cryptographic engine 1006 via a key manager interface or as defined in the packet header. These keys are used for security processing of the corresponding data packet.

After encryption by processing engine 1006, encrypted packets are provided to packet output engine 1004 for routing to programmable output interface 1012. The encrypted data leaves via physical interface 1016.

Programmable interfaces 1010 and 1012 may be formed using FPGAs or other programmable devices (e.g., as described above for I/O interfaces 106 or 208 of FIGS. 1 and 2). In one embodiment, physical interfaces 1014 and 1016 may form a part of interchangeable physical input/output interface 108. In one embodiment, physical interface 108 is implemented as a removable physical card.

In one embodiment, FPGAs 1008, 1018, and 1020 form a portion of the systolic-matrix array configuration illustrated in FIG. 10 and may be coupled to the packet input and output engines and cryptographic processing engine using serial buses. The packet input and output engines and cryptographic engine are formed using FPGAs to provide a two-dimensional systolic array of a top systolic layer. In one example, data and control processing is performed in two dimensions using the six FPGA units (e.g., FPGA 1008 and packet input engine 1002) as illustrated in FIG. 10.

In one embodiment, the sub-blocks in the packet input engine 1002 or packet output engine 1004 such as packet routing, packet multiplexer, and IP context lookup are implemented in a systolic-matrix array configuration as was discussed above. Data comes into the packet engine, and the packet engine looks at the packets, including the context, and decides where to route each packet. Then, the packet engine determines that a packet requires a particular security association, which is implemented using a key lookup. The packet engine associates the key to the incoming data. The key is read out, and the data is encrypted or decrypted in one of the crypto cores.

In one embodiment, high-speed memory is coupled to the input and output packet engines, and may be any type of high-speed memory in various embodiments.

In one embodiment, all primary processing works in a matrix. Data is constantly flowing in two dimensions. For example, data is flowing horizontally, keys are flowing up vertically, and control information is flowing down vertically as part of the two-dimensional processing.

Variations

Additional variations, details, and examples for various non-limiting embodiments of the above security processing system are now discussed below. In a first variation, with reference to FIG. 1, the programmable input/output interface 106 is a router/switch that selects one of the crypto modules 104 to receive forwarded packets. A router and switch are incorporated inside the input/output interface 106. For example, if a first packet comes through a second port, the first packet will be routed to crypto module number six. Crypto module number six will later route the first packet back out through that same second port of original entry.

There may be two components to the programmable I/O interface. On one side, the interface programs the type of I/O that is desired. The other side of the interface is the router/ switch. The router/switch multiplexer knows which crypto module 104 is to receive a given packet. Also, the router/switch knows which crypto module is ready for processing of a packet. For example, if crypto module number one is ready for processing, it will flag itself as being ready for processing. For example, there is a semaphore flag or packet header bits used that tells I/O interface 106 which module is ready to process data. Whatever port is used to bring in the data, that data will be processed in one of the crypto modules, and then tagged out back to the same port when later being decrypted and sent out from storage (e.g., the packet is tagged with some identification of the port using a tag). The tag is used to redirect the packet back to the correct port of original entry.

The crypto module has a security association that determines which keys go with which packet. The programmable input/output may allow programming of different applications because of the use of FPGAs. The back end of the router/switch will accommodate the type of input/output to be used. The router/switch will identify the crypto module to be used. When reprogramming the programmable interface 106, a new physical interface needs to be interchanged or installed. The main security device chassis is not changed out—only the I/O portion is being changed.

In one embodiment, remote ports 112 are basically control ports. The protocol for the remote port may typically be a Simple Network Management Protocol (SNMP) protocol or any other management protocols. The key fill port is where the keys are filled into the security device. The crypto ignition key ignites the security device.

With reference to FIG. 2, the Interbus serial bus (mentioned above) coordinates the operation of the two input/output interfaces 206, 218. The Interbus handles any protocol issues between the router and the switch functions of these interfaces. The Interbus is used to provide communication between the FPGAs of the systolic array during operation of the security device. In one example, the Interbus helps to coordinate operation as to which crypto module 104 will receive an incoming packet.

Processor 210 manages control plane operation. Processor 210 also configures components when a new security protocol will be used, uses routing tables, sets the configuration, sets up the programmability, and sets up the power-on self-test. Processor 210 also may facilitate key loading. The key fill port on the front of user panel 116 operates under control by processor 210.

With reference to FIG. 3, a secure boot is used to guarantee that the data booted into the FPGAs of the cryptographic module 104 is proper. The secure boot is executed when the unit is turned on or at boot-up. The code is authenticated by the system. The FPGAs are programmed at every boot up of the unit, or any time that the unit is reset. Each crypto module may have its own CPU which controls programming.

With reference to FIG. 8, external key management 802 is a location that the keys may be stored for passing to the security device 102. A network operator loads the keys into the external key management 802. The security device 102 loads the keys into the crypto modules. There is key tagging in the packet headers and inside the crypto module. When a packet comes into the security device 102, the packet is associated with a given key, and the packet contains information used to route the packet. The external key management can load keys in real-time or only a single time. Network services management 804 is remote management which provides control status, setting-up of the security device unit, and sending of the status back to a user. The other external management services 806 could be used to track how many other units are in the field, what the units are doing, whether each unit is running, and what configuration the unit is in.

In one embodiment, data packets include key tags, customer tags, and packet tags. The packet tag tells what type of packet is coming in. The customer tag identifies the company or source of the data. The key tag tells what key goes with what packet. Each tag is looked at by the packet engine to determine how the packet is going to be routed within the crypto module 104.

Now discussing an embodiment regarding flexible physical partitioning, each cryptographic module 104 may be physically isolated by design. So, only a certain packet will go through a module number one and only certain other packets will go through module number two. For example, crypto module number one may only process a certain style of packet. Crypto module number two may only process packets for a particular customer. Thus, it is physically partitioned. For example, customer number one's data is tagged as belonging to customer number one, for sending it to the specific crypto module. The router determines this requirement, and only that particular crypto module can process that customer's packet.

Regarding internal key management in the crypto module's performance, the key manager loads the keys, and further decides how the keys are dispersed within the crypto module based on the tagging of the incoming data packet. Keys are stored in the selectable key cache 908. The key manager decides based on the tagging of the data packet what keys will be associated with the current packet. This provides key agility.

With reference to FIG. 9, API 904 may be programmed to map into any of several different external key managers 906. The use of API 904 thus provides increased flexibility.

Multi-Tenancy Architecture

Figure 11:
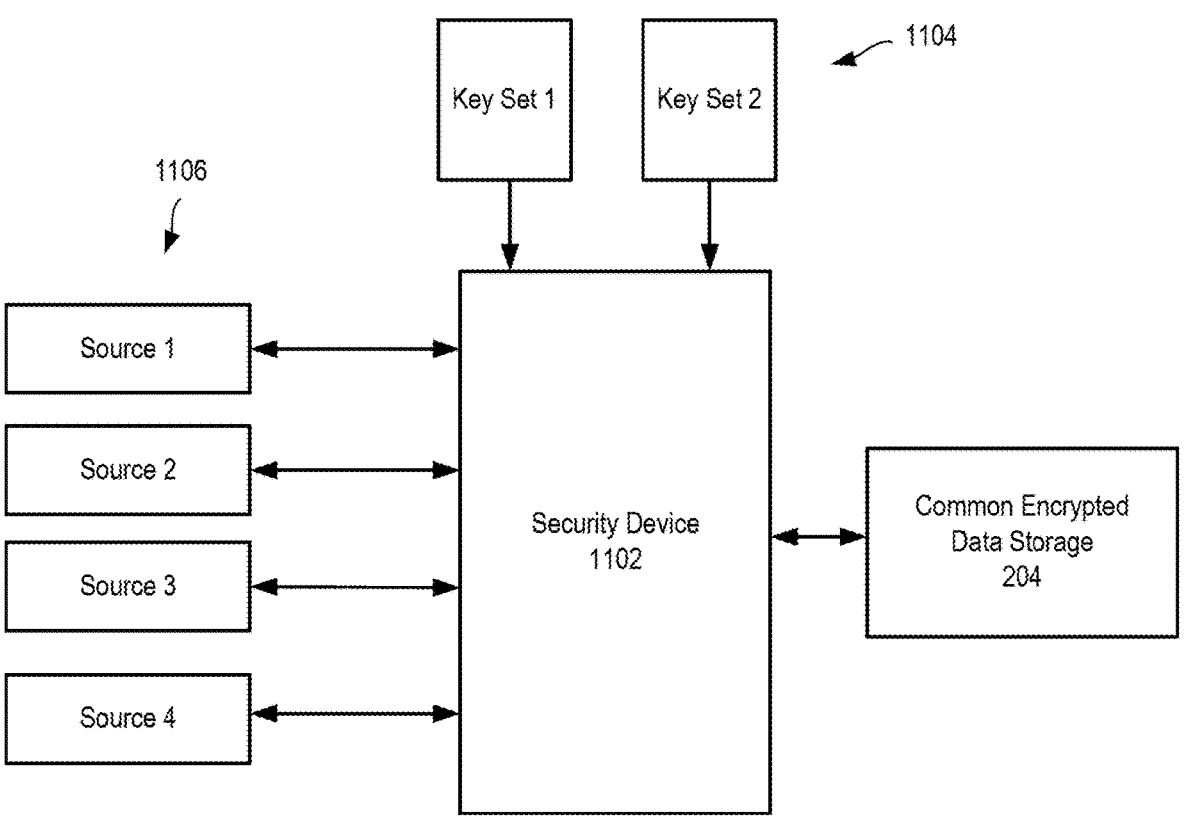
FIG. 11 shows a multi-tenancy system including a security device, according to one embodiment.

FIG. 11 shows a multi-tenancy system including a security device 1102, according to one embodiment. Security device 1102 is configured for cryptographic processing. Security device 1102 receives incoming data from a plurality of data sources 1106. For example, the incoming data includes first data from a first data source (Source 1). More specifically, the cryptographic processing includes encryption of data packets written to the common encrypted data storage 204, and decryption of data packets read from the common encrypted data storage 204.

A controller (not shown) is configured to select a first set of keys from a plurality of key sets 1104. Each of the key sets 1104 corresponds to one of the plurality of data sources 1106. The first set of keys (e.g., Key Set 1) is used by the security device to encrypt the first data. Common encrypted data storage 204 receives the encrypted first data from security device 1102.

The controller may be, for example, a key manager as discussed further below. In one embodiment, the security device 1102 includes the controller. In one embodiment, the controller is an internal key manager (e.g., as discussed above for FIG. 9 and internal key manager 902).

In one embodiment, the first data is a first data packet, and security device 1102 is configured to detect a tag of the first data packet that identifies the first data source (e.g., Source 1). The controller selects the first set of keys (Key Set 1) based on the detection of the tag.

Each of the plurality of data sources is typically located at a different physical location for a respective user (e.g., an entity such as a company or individual) using the common encrypted data storage 204 to store data sent over a network (e.g., the Internet or another communication link) to the security device 1102.

Figure 12:
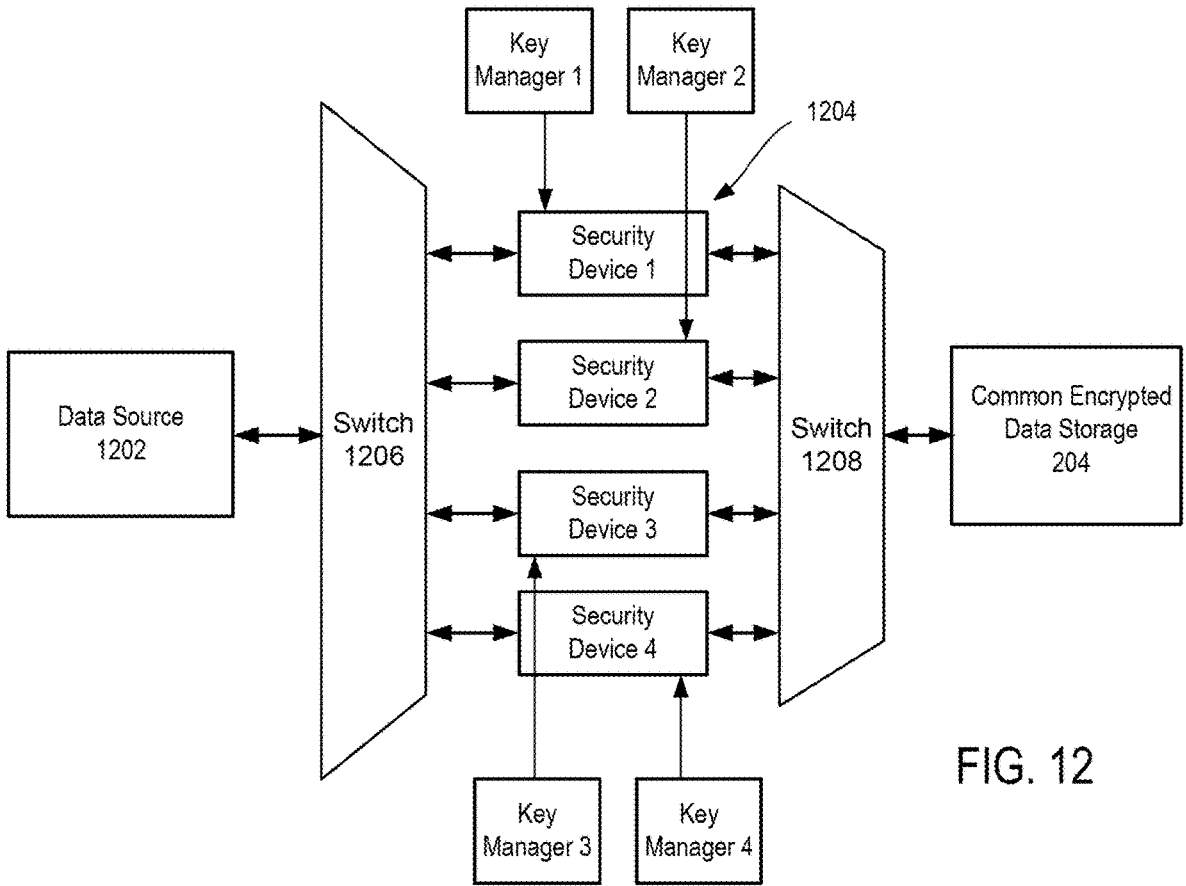
FIG. 12 shows a multi-tenancy system including multiple security devices and key managers, according to another embodiment.

FIG. 12 shows a multi-tenancy system including multiple security devices 1204 and key managers (Key Manager 1, 2, 3, 4), according to another embodiment. Each of the key managers may be, for example, an external key manager such as described for FIGS. 8 and 9 above.

Each of the security devices 1204 is configured for cryptographic processing and receives incoming data from at least one data source 1202. Each of the key managers is associated with a user (e.g., corporation or an individual). For example, a given user may control an external key manager that provides keys to one of the security devices 1204 for cryptographic processing of that user's data. A switch 1206 receives the incoming data from data source 1202 and routes the incoming data to one of the security devices. For example, switch 1206 may route the data to the security device that corresponds to the user that sent the data for storage.

Each key manager is coupled to a respective one of the security devices 1204, and each key manager is configured to provide a set of keys to a particular security device 1204 for encryption of incoming data associated with the respective user. The incoming data is then stored in common encrypted data storage 204 after the encryption.

Switch 1208 is used to route the encrypted data from the security device to encrypted data storage 204. When data is read from common encrypted data storage 204, switch 1208 routes the data to the appropriate security device 1204 for decryption processing.

In one embodiment, security devices 1204 include a first security device (Security Device 1). The key managers include a first key manager (Key Manager 1). The first security device comprises a key cache (not shown) configured to store a first set of keys (e.g., Key Set 1 as shown in FIG. 11) that are received from the first key manager. The first set of keys is loaded into a cryptographic core (not shown) of the first security device and then used to encrypt data packets in the incoming data.

Figure 13:
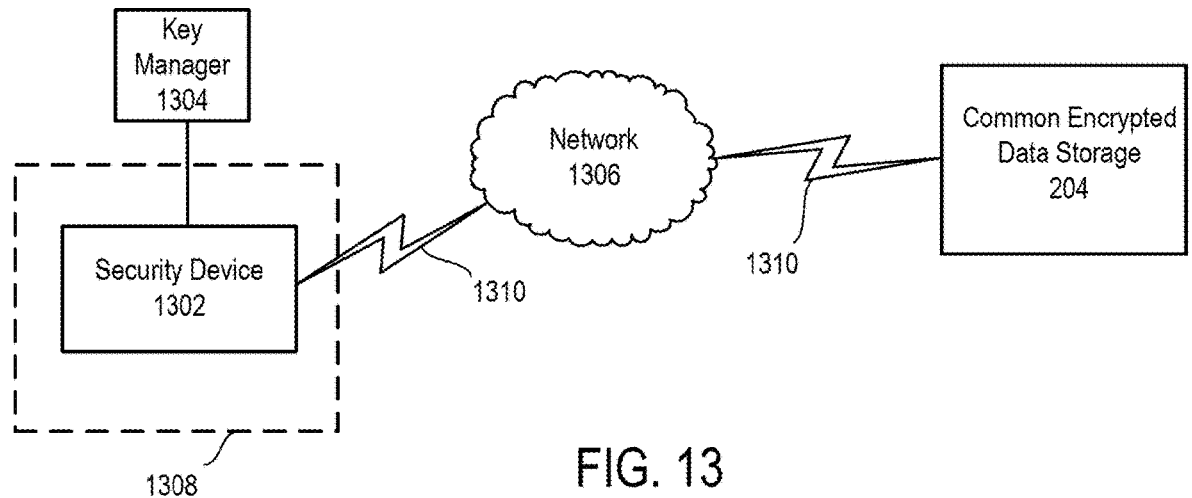
FIG. 13 shows a security device in communication over a network with a common data storage, according to one embodiment.

FIG. 13 shows a security device 1302 in communication over a network 1306 (via communication links 1310) with common data storage 204, according to one embodiment. In this embodiment, the controller discussed for security device 1102 above is an external key manager 1304 that provides keys to the security device 1302 via an application programming interface (as was discussed for FIG. 9 above). In one embodiment, the first data source 1106 of FIG. 11 corresponds to a first user, and external key manager 1304 receives commands from this first user to control access to the first set of keys by the security device 1302.

In FIG. 13, security device 1302 is shown located at a physical location or site 1308 of the first user. In other embodiments, security device 1302 may be located at the physical location of common encrypted data storage 204. In these other embodiments, key manager 1304 may still remain at physical location 1308 under the control of the first user.

Figure 14:
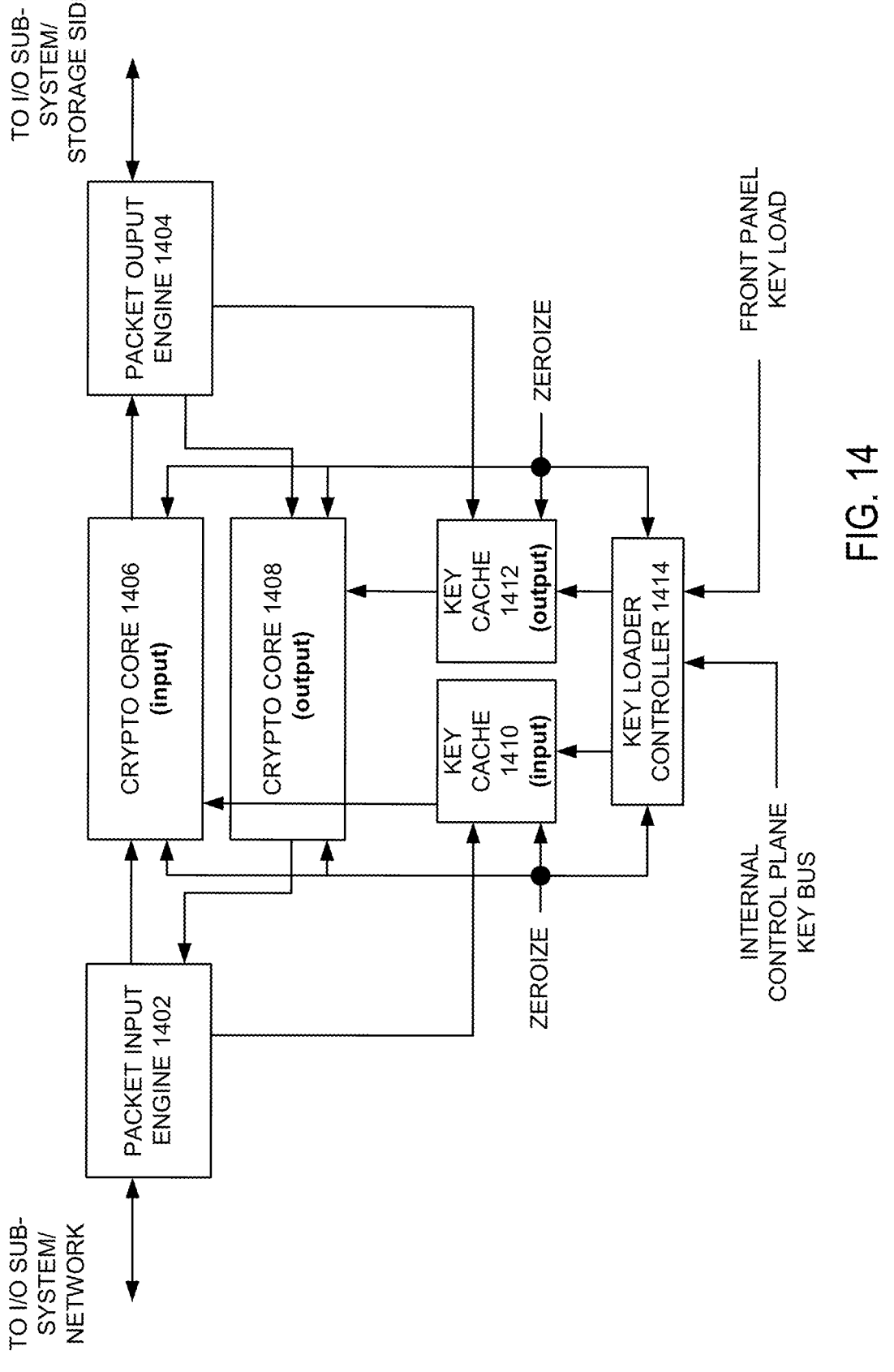
FIG. 14 shows a block diagram of a multi-tenancy cryptographic module including cryptographic cores and key caches, as used in a multi-tenancy architecture according to one embodiment.

FIG. 14 shows a block diagram of a multi-tenancy cryptographic module including cryptographic cores 1406, 1408 and key caches 1410, 1412, as used in a multi-tenancy architecture according to one embodiment. The cryptographic module is, for example, included in security device 1102 of FIG. 11, or in one or more of security devices 1204 of FIG. 12. Cryptographic core 1406 is an input core configured to perform encryption for data packets received from packet input engine 1402. Cryptographic core 1408 is an output core configured to perform decryption for data packets received from packet output engine 1404.

Input key cache 1410 and output key cache 1412 each store a plurality of key sets. A first set of keys is selected from the key sets stored in key cache 1410 to encrypt a first data packet by the input core 1406. Packet input engine 1402 is configured to detect a header of the first data packet and to address the first set of keys. In one embodiment, the cryptographic module includes a processor (not shown) configured to verify that the packet input engine 1402 is authorized to address the first set of keys.

The cryptographic module includes a key loader controller 1414 to load keys, for example, from an external key manager via an application programming interface. The key loader controller 1414 loads the first set of keys for storage in key cache 1410 prior to receipt of the first data packet by the cryptographic module. In one embodiment, key cache 1410 and key cache 1412 are each configured so that a key cache failure causes the respective key cache to be zeroized.

Stored keys are loaded into the appropriate cryptographic core 1406 or 1408 from key cache 1410 or 1412. The packet input engine 1402 provides a signal (e.g., an addressing signal) used by input key cache 1410 to select the first set of keys for use by the cryptographic core 1406 in encrypting incoming data packets. Packet output engine 1404 addresses keys in key cache 1412 in a similar way for decrypting outgoing packets.

Packet output engine 1404 provides encrypted data packets from the input core 1406 when writing data to common encrypted data storage 204. Packet output engine 1404 detects a header of each data packet when reading from the common encrypted data storage 204 in order to address a set of keys in output key cache 1412 for decrypting each data packet by output core 1408. Output core 1408 provides the decrypted data packets to packet input engine 1402, which sends the data packets to one of data sources 1106 of FIG. 11.

In one embodiment, input key cache 1410 stores a set of keys for encryption and output key cache 1412 stores a set of keys for decryption. The cryptographic module is configured to zeroize input core 1406, the input key cache 1410, and key loader controller 1414 after encrypting the first data packet. Output core 1408, output key cache 1412, and key loader controller 1414 are zeroized after decrypting data packets read from common encrypted data storage 204.

In one embodiment, as described in more detail below, a secure multi-tenancy system is provided to encrypt a customer's data to minimize or avoid situations where data is mistakenly read by another customer. The system reduces the risk of unauthorized access to a customer's data.

The packet input engine 1402 performs header detections, or modifications, and will authenticate and associate the customer's data. Once the data is authenticated and identified, packet input engine 1402 will address the unique specific customer's key in input key cache 1410. The input key cache 1410 stores this customer's specific keys. The input key cache also has a fail safe and key authentication processor (not shown) to verify the packet input engine 1402 is authorized to address the keys within the input key cache.

Key loader controller 1414 loads and verifies keys and addresses from the packet input engine 1402. A fail safe feature of the input key cache 1410 and key loader controller 1414 is that any key cache failure will result in a zeroized key cache. The key loader controller 1414 and the respective input or output key cache is designed to ensure the proper key is associated with the data that will be encrypted or decrypted. The key controller and each key cache is designed to be fail safe, in that if there is any failure in the key controller or one of the key caches, the cryptographic module will fail to a known state and the data will not be compromised.

Each of the key caches is designed to store, for example, one or more millions of keys. In one embodiment, each key cache writes keys one way to its respective cryptographic core (i.e., input core or output core).

Packet output engine 1404 performs header detections, or modifications, and authenticates and associates the customer's data read from common encrypted data storage 204. Once the data is authenticated and identified, packet output engine 1404 addresses output key cache 1412. The output key cache 1412 operates similarly to the input key cache 1410, discussed above.

Each cryptographic core is an encryption/decryption engine to encrypt or decrypt the data from the packet input/output (I/O) engines discussed above. The keys are loaded from the respective key caches, as was discussed above.

In some embodiments, the multi-tenancy architecture detects the packet header and associates the keys that will be encrypted/decrypted. There is an option provided for the keys in the key cache to be encrypted using a key encryption key or to be un-encrypted. The multi-tenancy architecture is configured to provide selected encrypted data into common storage area 204 (e.g., for data storage or for internal network processing and use). In one embodiment, the multi-tenancy architecture authenticates the I/O packet engines to the associated encryption and decryption keys within the respective input or output key cache for simultaneous two-way data traffic. The system requires that data be encrypted with a set of keys associated to a specific customer's data.

The multi-tenancy architecture may have fail safe features to ensure in cases of failure that the multi-tenancy architecture will fail to a safe state. Each key cache may be coupled to a fail safe key loader controller to authenticate the packet engines and send the correct key addresses. The key cache may be fail safe with authentication. The cryptographic core may use fail safe features and key agility to process keys from the respective key cache and data from the input/output packet engine.

Additional variations, details, and examples for various non-limiting embodiments of the multi-tenancy architecture/ system are now discussed below. In a first variation, data is coming in from many different customers. Data is stored in one large database and in an encrypted form. For example, a first company's key and a second company's key are each loaded into the multi-tenancy system. The first company's key is selected for processing the first company's data.

In another variation, no entity but the customer is able to see the keys of the customer. The customer controls the keys by interacting with the key manager discussed above. The customer's keys cannot be lost by a data storage center operator, and cannot be used by another company.

In one example, each customer owns its own security device unit and controls and manages its own key manager. The other equipment of the data storage center can be commonly owned and operated by the data storage center operator. Each customer's security device unit is installed at the data storage center or at the customer's physical location.

In one variation, the internal control plane key bus as illustrated in FIG. 14, provides user or operational keys into key loader controller 1414. The front panel key load as illustrated in FIG. 14 is used to load keys from a key loader into the key loader controller 1414.

Secure End-to-End Communication System

In various embodiments below, different architectures of a secure communication system are described. Specifically, there are four illustrated embodiments for securing data to and from the data source to the end user (without the need for VPN-IPSec).

In each architecture illustrated below, the data to be accessed may be stored in an encrypted form, for example, in a data center or corporate data storage facility. This provides two levels of protection: the data stored in the data/corporate center is encrypted/protected from unauthorized access. When the data is sent over the Internet or other network, the data is still encrypted, but does not require any special set-up. For example, encrypted data packets may be sent without modification to the network, packets, or packet headers.

In one embodiment, a traditional VPN (virtual private network) is replaced using an end-to-end encryption from the data storage to the end user without the need to install costly VPN equipment and without requiring any network modifications. In addition, there is no overhead or complexity of establishing an IPSEC tunnel, which can have the problems of maintaining an IPsec connection over various IP mobile networks. In other words, this embodiment is based on a secure encrypted end-to-end system without the need to set-up a VPN tunnel or IPsec. Thus, this embodiment can avoid the need for today's VPN technology in many specific applications.

In some embodiments, the secure communication system described below may be implemented in a multi-tenancy architecture as described above. In other embodiments, the security devices (e.g., security device 102 of FIG. 1) and related systems and methods discussed above may be used when implementing the secure communication system.

Figure 15:
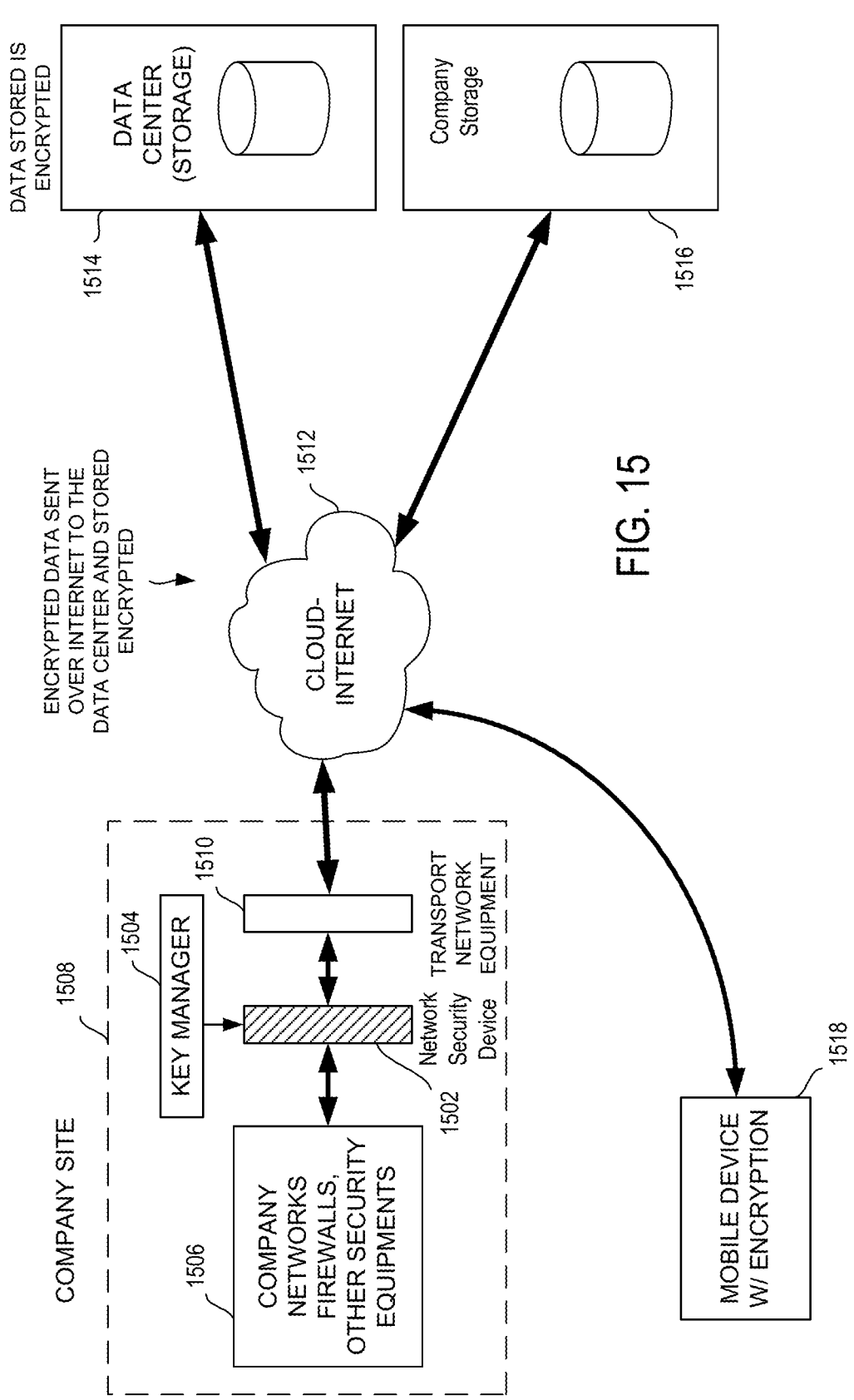
FIG. 15 shows a first architecture of a secure communication system, including a network security device and a key manager, for storing encrypted data according to one embodiment.

FIG. 15 shows a first architecture of a secure communication system, including a network security device 1502 and a key manager 1504 located at a company site 1508, for storing encrypted data according to one embodiment. Network security device 1502 receives first data (e.g., data packets) from an internal network (e.g., networks or firewalls 1506). Security device 1502 encrypts the first data with a first set of keys (the first set may be a single key or multiple keys, depending on the implementation), and provides the encrypted first data for sending by transport network equipment 1510 over a network 1512 (e.g., the Internet, or other internal or external network) to a mobile device 1518 or an external site 1514, 1516. Key manager 1504 loads the first set of keys into security device 1502.

In one embodiment, the key manager 1504 is an external key manager (e.g., external key manager 906 of FIG. 9 above) and is further configured to select the first set of keys from a plurality of key sets (e.g., stored in a key cache), and to provide the first set of keys to the security device 1502 via an application programming interface (e.g., API 904 of FIG. 9).

In one embodiment, the security device 1502 subsequently receives, over the network 1512, the encrypted first data from the mobile device 1518 or external site 1514, 1516. The received data is decrypted by security device 1502 using the first set of keys.

In one embodiment, the security device 1502 is a first security device and the mobile device 1518 or external site 1514, 1516 includes a second security device (not shown) configured to receive, over the network, the encrypted data, and to decrypt the received data with the first set of keys (e.g., the first set of keys may be loaded into the second security device prior to receiving the encrypted data from company site 1508).

In one embodiment, a method includes loading, by key manager 1504, a first set of keys into security device 1502; encrypting first data with the first set of keys using the security device 1502; and sending, over network 1512, the encrypted first data to external site 1514, 1516 or to mobile device 1518. In one embodiment, the method further includes requesting the encrypted data from the external site or mobile device; receiving, over the network, the encrypted first data; and decrypting the received encrypted first data with the first set of keys using the security device. For example, the external site may be a data center, a storage site, or a computing site.

In one embodiment, a customer (e.g., the operator of the company site 1508) or other user is using external data center 1514 or corporate storage site 1516 to store its data. The customer encrypts the data (e.g., using a security device such as a network encryptor) and sends the data over the Internet or other open network to the external data center or corporate storage site. The external data center or corporate storage site then stores the data in an encrypted form.

In one embodiment, the external data center or corporate storage site processes the data per its normal protocols. The network encryptor or other security device only encrypts the data packets and keeps all network headers and protocols in the clear. This same approach can be used for both company sites and mobile users to access data from an external data center or corporate storage site. The company site key manager 1504 loads the keys into a network security device. This architecture may be used in some implementations for multi-tenancy storage, such as was described above. No VPN is required and no special service provider set-up is required.

In various embodiments, the following features relate to transmitting or sending company site or mobile device data to the external data center or corporate storage site:

1. Data packets are encrypted by the network encryptor or other security device using selected key(s) (loaded by the key manager).
2. No modification to the IP headers is required. However, the end user/customer has the option to add tagging information in the headers (in the open fields in the header) for various key management functions (e.g., such as the tagging discussed above for the programmable cryptographic system).
3. The encrypted data is sent over an open network to the external data center or corporate storage site and is stored. The data is stored encrypted and protected from unauthorized access.
4. The network security device 1502 is located between the firewalls 1506 and the transport network equipment 1510. Thus, the firewalls and other equipment process the data in the clear.

The following features relate to receiving data from the external data center or corporate storage site:

1. The company site 1508 or mobile device 1518 requests its data from the external data center or corporate storage site.
2. The encrypted data is sent over the open network 1512.
3. The company site or mobile device decrypts the data and the data is ready for usage.

Figure 16:
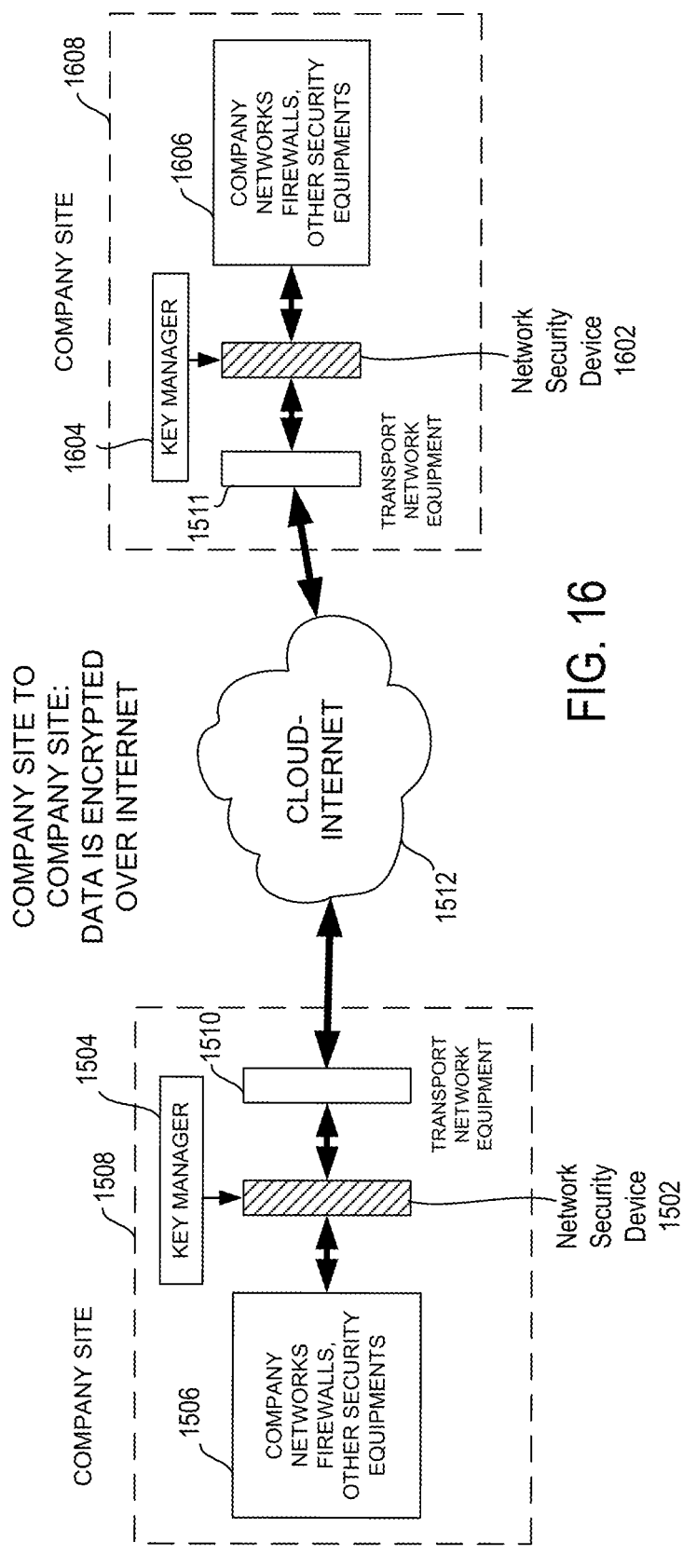
FIG. 16 shows a second architecture of a secure communication system for securely sending data between two company sites, according to one embodiment.

FIG. 16 shows a second architecture of a secure communication system for securely sending data between two company sites 1508 and 1608, according to one embodiment. These sites are controlled or operated by the same company, individual, or other user. In one embodiment, the site 1608 is a second, external computing site of the user, and the user controls both of the key managers 1504 and 1604.

In one embodiment, network security device 1502 encrypts data that is sent to site 1608 using a first set of keys. Transport network equipment 1510 sends the encrypted first data over the network 1512. At site 1608, transport network equipment 1511 receives the data. Network security device 1602 decrypts the received data with the same first set of keys. The decrypted data is provided to networks, firewalls, and other equipment 1606.

Key manager 1604 loads the first set of keys into network security device 1602 prior to receipt of the data. In some cases, key managers 1504 and 1604 are the same external key manager and are under control of the user.

In one embodiment, the company sites send and receive encrypted data over an open network. The network encryptor or other security device encrypts data when sending data over the open network and decrypts when receiving encrypted data. This general approach can be applied to any desired number of company sites that are sharing data. No VPN is required and no special service provider set-up is required. The key manager 1504, 1604 for all company sites is established by any secure means to send or insert the keys to each site.

Figure 17:
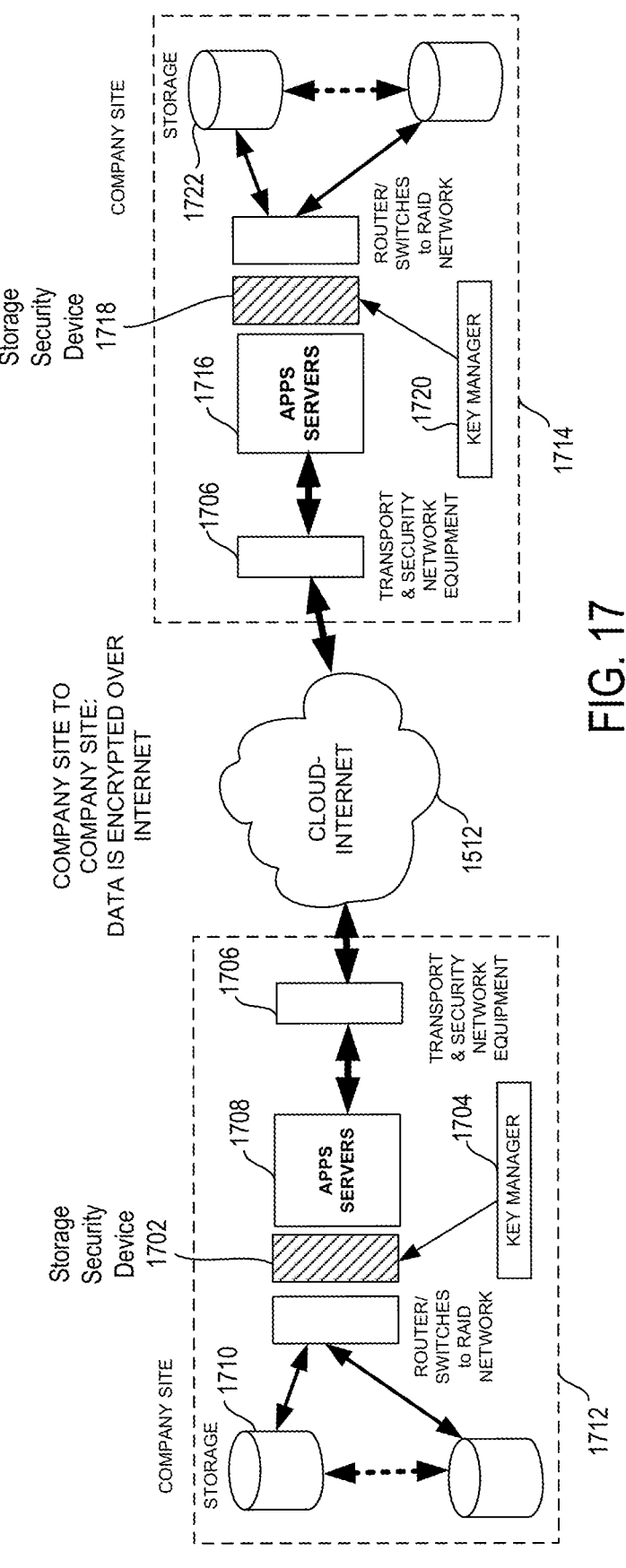
FIG. 17 shows a third architecture of a secure communication system for sharing stored encrypted data between two company sites, according to one embodiment.

FIG. 17 shows a third architecture of a secure communication system for sharing stored encrypted data between two company sites 1712 and 1714, according to one embodiment. Security device 1702 is a storage security device that encrypts and decrypts, as needed for access by application server 1708, data stored in encrypted form in data storage 1710. Stored encrypted data may be sent by transport network equipment 1706 to company site 1714 in an encrypted form directly from storage without being decrypted by storage security device 1702 prior to sending. The encrypted data is stored directly into data storage 1722 without being decrypted by storage security device 1718 prior to such storage. Storage security device 1718 at a later time will decrypt the data from data storage 1722 when application server 1716 needs access to the data. Key managers 1704 and 1720 load a first set of keys into storage security device 1702 and storage security device 1718 prior to the time that access to data may be required. Key managers 1704 and 1720 may be the same external manager under the control of the company or other user associated with the company sites.

In one embodiment, the storage security device 1702 encrypts all data being stored on the storage network 1710 within company site 1712. When sharing data between company sites 1712 and 1714, the data is read from the encrypted stored data storage 1710 and by-passes the network security device (not shown). The encrypted data is sent by transport network equipment 1706 over the open network 1512 to the requesting company site 1714.

The requesting company site 1714 then stores the encrypted data in its data storage network 1722. When the requesting company site 1714 access the data, storage security device 1718 decrypts the data using the key(s) (e.g., previously established by key manager 1720) and then accesses the data such as with application server 1716.

In one embodiment, a similar process to the above is used when site 1712 requests data that is read from site 1714. This data is decrypted by storage security device 1702 when application server 1708 needs access to the data. Key manager 1704 is used to load the key(s) into storage security device 1702 prior to requesting this data.

Figure 18:
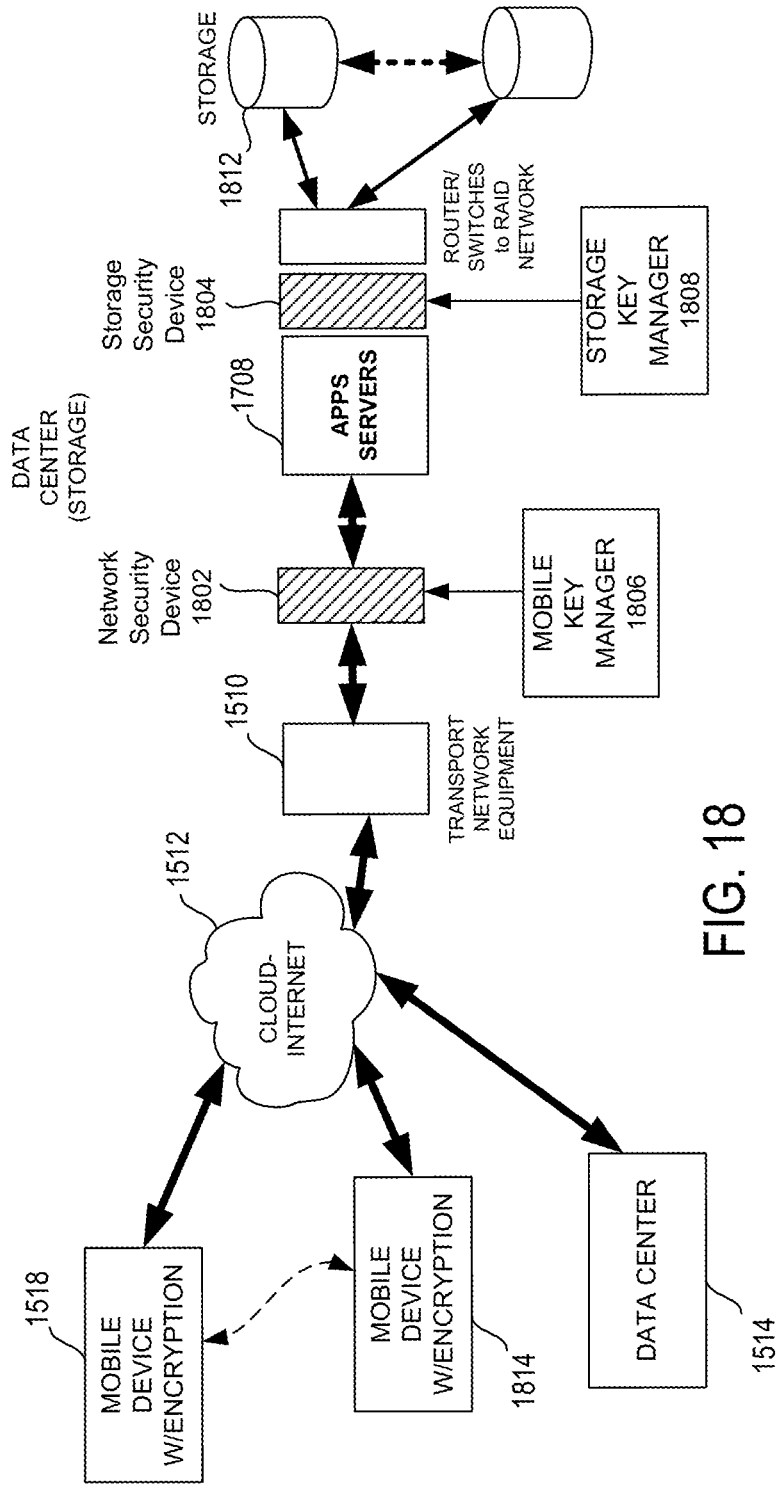
FIG. 18 shows a fourth architecture of a secure communication system using two levels of encryption with a network security device and a storage security device, according to one embodiment.

FIG. 18 shows a fourth architecture of a secure communication system using two levels of encryption with a network security device 1802 and a storage security device 1804, according to one embodiment. Storage key manager 1808 loads a first set of keys into storage security device 1804. Mobile key manager 1806 loads a second set of keys into network security device 1802.

First data obtained from a data storage 1812 is decrypted by storage security device 1804 using the first set of keys. Network security device 1802 encrypts the first data using the second set of keys. The encrypted first data is then sent over network 1512 by transport network equipment 1510.

The encrypted first data may be sent to mobile device 1518 or 1814, or to an external site such as data center 1514. Each of the mobile devices and the external site has a security device configured to decrypt the first data using the second set of keys. The second set of keys may have been pre-loaded for this purpose using mobile key manager 1806. In one embodiment, a key address is sent with the first data over the network 1512. This key address is used by the mobile device or external site in selecting the second set of keys when decrypting the first data.

In one embodiment, an authentication code is sent with the first data over the network 1512, and the authentication code is used to authenticate the mobile device or external site and verify that a proper key address is used when selecting the second set of keys. In some embodiments, both the key address and the authentication code are sent with the first data.

Application server 1708 receives the decrypted first data from the storage security device 1804, and provides the first data to the network security device 1802 for encryption prior to the sending of the encrypted first data over the network by the transport network equipment 1510. In some cases, the first data is accessed by an application on application server 1708 prior to sending the first data.

In one embodiment, the storage security device 1804 is a storage encryptor used to encrypt data prior to storing the data (e.g., in drive arrays of data storage 1812). The storage encryptor has dedicated key manager 1808. When writing from the application servers of application server 1708 to the storage array 1812, the storage encryptor will encrypt the data payload only and leave its headers in the clear. The encryption keys can be a set of keys having one key or multiple keys and are determined by the key manager 1808.

When reading the storage array 1812, the storage encryptor decrypts the outgoing data with the correct key(s). The decrypted data is sent to the application server 1708. If the data is being read (requested) by a mobile or external device, the data is sent from the application server 1708 to network security device 1802 (e.g., a network encryptor). The network encryptor encrypts the data with the same key as used for the targeted mobile or external device.

The encrypted data is then sent over an open network (e.g., network 1512) to the mobile or external device with an authentication code and key address in the header (e.g., header of a data packet). The mobile or external device/site then decrypts the data by using the key address in the header. No VPN technology or protocols are required to transfer the encrypted data to the mobile or external device.

In the above embodiment, the key address and authentication code are used as follows:
  1. The key authentication code validates that the key is the correct key, and then the key address associates the encrypt/decrypt keys used in the end-to-end communication between network security device 1802 and the mobile device or external device/site.

2. The authentication field in the header is used to authenticate the end user device or external device/site (the authentication code is calculated from the authentication field), and to verify that the correct key address is applied to the end-to-end communication. In other words, the key authentication is used to verify that the key from a given user is applied to data of that user. It is another level of authentication beyond merely just the key.

In one embodiment, when the mobile or external device/site sends data to be stored in the external storage system 1812, the mobile or external device/site encrypts the data using a key (with a specific key address in the header of, for example, a data packet) and sends the encrypted data to the other end of the system (i.e., the data center) to store the data. The encrypted data is received by the end system/data center and decrypted by the network encryptor 1802 using the key address embedded in the header.

In one embodiment, the network encryptor 1802 sends the clear data to the application server 1708 for two actions:

1. The application server 1708 processes the data and sends the data to the storage encryptor 1804, and the storage encryptor 1804 encrypts the data and sends the data to the storage system 1812.

2. The application server 1708 processes the data and sends the data back to the network encryptor 1802 that then sends the encrypted data back to the mobile or external device.

In one embodiment, the key management can be set-up during the configuration of the mobile or external device/site by the administrator, or set-up using another key management protocol. The keys are loaded into specific key addresses in the end user's device (or at the external site) with authenticated means to verify the keys are authenticated to each end of the secure communication channel.

Some embodiments of the secure communication system provide one or more of the following features:

1. The encryption does not require any VPN technology or set-up nor any modifications to the IP packets.

2. There is not a required special set-up—the end-users and storage receive/process the data as if it were not encrypted.

3. The key management is controlled by the data storage facility to insert keys into the end users' devices and the network encryptor located in the data storage facility.

4. Dual use of the encryptor is permitted: one use is for mass storage and the other use is for sending encrypted data to end users. Network and storage encryptors may be separate units or a single unit performing both network and storage encryption.

Additional variations, details, and examples for various non-limiting embodiments of the secure communication architecture/system are now discussed below. In a first variation, the communication system above may be used for secure communication between customers/end users, and data centers or company storage access facilities. For example, a company located off-site can encrypt data, send it over the Internet, and store it into any storage area such as a data center or other forms of storage. When the company is reading the data, it is in an encrypted form, and the data comes back to the same key manager at the company site for decryption and then local use on the company internal network.

Similarly to the company site, a mobile device can interact with a storage area as discussed above. The mobile device may be, for example, a tablet or a portable computer.

Stationary devices such as a desktop computer may also use the security communication system.

Regarding FIG. 15, in another variation, there are two different sets of keys. The key manager 1504 has the primary set of keys. The company gives the mobile device a secondary set of keys such as expendable keys having a limited life. When the mobile device 1518 reads data from the data center, the data center only gives the mobile device that data which it is permitted to read. The mobile device may read the data and the secondary set of keys may be discarded in some cases after use.

Regarding FIG. 16, in one variation, this shows two company sites. The company is sending a large amount of data between the sites using the same system and is encrypting the data at both ends. So, a VPN network is no longer needed. The key managers 1504, 1604 are controlled at both sites by the same company. Since the company controls the key managers used at its sites, the company can do secure communication between the sites.

Regarding FIG. 17, in one variation, the security device is behind the firewall (e.g., the firewall may be provided by security network equipment 1706), as contrasted to FIG. 16, in which the security device is outside of the firewall 1506.

Regarding FIG. 18, in one variation, there are two encryptors. There is an encryptor 1804 dedicated for storage. In front of the application server 1708 there is another encryptor 1802 dedicated to sending data outside of the network. In an alternative approach, a single box or hardware unit can be used to provide the functions of both the network encryptor and the storage encryptor.

CLOSING

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a key cache;
at least one processor; and
memory storing instructions configured to instruct the at least one processor to:
    load a first set of keys into the key cache;
    provide the first set of keys to an external site;
    receive a first data packet;
    encrypt the first data packet with the first set of keys;
    send the encrypted first data packet to the external site, wherein a key address is sent in a header of the encrypted first data packet to the external site, and wherein the key address is used by the external site to select the first set of keys for decrypting the first data packet;
    request, from the external site, the encrypted first data packet; and
    receive, from the external site in reply to the request, the encrypted first data packet.

2. The system of claim 1, wherein the external site is configured to be authenticated before storing the encrypted first data packet.

3. The system of claim 1, wherein the first set of keys is selected from a plurality of key sets.

4. The system of claim 1, wherein the external site includes a computing device configured to receive, over a network, the encrypted first data packet, and to decrypt the received first data packet with the first set of keys.

5. The system of claim 1, further comprising a computing device configured to decrypt the first data packet with a second set of keys after obtaining the first data packet, and prior to the encrypting of the first data packet.

6. The system of claim 5, wherein the second set of keys is stored in the computing device.

7. The system of claim 5, further comprising a server configured to receive the decrypted first data packet from the computing device, and to provide the decrypted first data packet for encryption prior to sending the encrypted first data packet.

8. A method comprising:
providing, by at least one processor, a first set of keys to an external site;
receiving a first data packet from a data storage;
encrypting, by the at least one processor, the first data packet with the first set of keys;
authenticating the external site; and
after authenticating the external site, sending the encrypted first data packet to the external site, wherein a key address is sent in a header of the encrypted first data packet to the external site, and wherein the external site is configured to use the key address to select the first set of keys.

9. The method of claim 8, wherein the external site is a site of a user that controls the first set of keys.

10. The method of claim 8, further comprising:
receiving, over a network by the external site after authenticating the external site, the encrypted first data packet.

11. The method of claim 10, further comprising loading, by the at least one processor, the first set of keys into memory.

12. The method of claim 8, further comprising:
receiving, over a network at the external site, the encrypted first data packet;
storing the encrypted first data packet in a data storage at the external site; and
after the storing of the encrypted first data packet in the data storage at the external site, accessing the encrypted first data packet by decrypting the first data packet at the external site.

13. The method of claim 12, further comprising loading, by a key manager, the first set of keys into a computing device at the external site.

14. A communication system comprising:
a first and second security device configured for cryptographic processing;
a first and second key manager dedicated to the first and second security device, respectively, the first key manager being configured to provide a first set of keys for the cryptographic processing of the first security device and the second key manager being configured to provide a second set of keys for the cryptographic processing of the second security device, the first and second set of keys being different from each other;
a first switch configured to receive data packets from a data source and selectively output the received data packets to either the first or second security device for encryption, the selection of the first or second security device being based on a classification of the received data packets from the data source; and
a second switch configured to selectively receive encrypted data packets from either the first or second security device and output the encrypted data packets to a data storage, wherein a header of at least one of the encrypted data packets includes a key address.

15. The communication system of claim 14, wherein the second switch is further configured to receive an encrypted first data packet from the data storage and output the encrypted first data packet to the first security device for decryption; and the first switch is further configured to receive the decrypted first data packet from the first security device and output the decrypted first data packet to the data source.

16. The communication system of claim 14, wherein the selection of the first or second security device is further based on a user associated with the received data packets from the data source.

17. The communication system of claim 14, wherein the data storage is located in an external site.

\* \* \* \* \*